(12) United States Patent
DeMong et al.

(10) Patent No.: US 7,949,447 B2
(45) Date of Patent: May 24, 2011

(54) STEERING SYSTEM AND METHOD FOR TRAIN OF WHEELED VEHICLES

(75) Inventors: Maurice DeMong, Wakaw (CA); Ashley Debnam, Saskatoon (CA)

(73) Assignee: Prairie Machine & Parts Mfg. (1978) Ltd., Saskatoon (CA)

( * ) Notice: Subject to any disclaimer, the term of this patent is extended or adjusted under 35 U.S.C. 154(b) by 0 days.

(21) Appl. No.: 12/459,498

(22) Filed: Jul. 1, 2009

(65) Prior Publication Data

US 2009/0276122 A1 Nov. 5, 2009

Related U.S. Application Data

(63) Continuation of application No. PCT/CA2008/000242, filed on Feb. 7, 2008.

(30) Foreign Application Priority Data

May 9, 2007 (CA) .................................... 2588161

(51) Int. Cl.
- *A01B 69/00* (2006.01)
- *B62D 6/00* (2006.01)
- *B62D 11/00* (2006.01)
- *B62D 12/00* (2006.01)
- *B63G 8/20* (2006.01)
- *B63H 25/04* (2006.01)
- *G05D 1/00* (2006.01)

(52) U.S. Cl. ....... 701/41; 280/411.1; 280/419; 280/426; 280/442; 280/463; 180/14.1; 180/235; 180/418; 198/300; 198/303; 198/804

(58) Field of Classification Search .................... 701/41; 280/411.1, 419, 426, 442, 463; 180/14.1, 180/14.2, 235, 418; 198/300, 303, 804
See application file for complete search history.

(56) References Cited

U.S. PATENT DOCUMENTS

| | | | | |
|---|---|---|---|---|
| 3,701,547 A | * | 10/1972 | Goold | 280/432 |
| 3,865,208 A | * | 2/1975 | Crawshay et al. | 180/6.48 |
| 4,031,997 A | | 6/1977 | Nelson | |
| 4,137,638 A | * | 2/1979 | Watts | 33/701 |
| 4,366,966 A | * | 1/1983 | Ratsko et al. | 280/432 |

(Continued)

OTHER PUBLICATIONS

Dirk de Bruin, Lateral Guidance of All-Wheel Steered Multiple-Articulated Vehicles, Jun. 2001, University of Eindhoven, pp. 1-199.*

*Primary Examiner* — Khoi Tran
*Assistant Examiner* — Jaime Figueroa
(74) *Attorney, Agent, or Firm* — Lipsitz & McAllister, LLC

(57) ABSTRACT

A steering system and method are capable of steering a plurality of vehicles arranged in a train with adjacent vehicles pivotally connected to each other for movement about a vertical axis. Each vehicle has a pair of steerable wheels with one pair at one end of the train being a selected leading pair having its steering angle determined by an operator. An electrical control system automatically steers all of the wheels trailing behind the leading pair. Vehicle angle sensors measure inter-car angles between adjacent vehicles and provide this information to the control system. An indicator provides the controller with the current distance traveled by the train. Wheel angle sensors provide signals indicative of the current steering angle for each wheel pair. The controller adjusts the actual steering angle for each trailing pair to a desired angle by calculating adjustments based on the measurement inputs.

17 Claims, 21 Drawing Sheets

U.S. PATENT DOCUMENTS

| | | | |
|---|---|---|---|
| 4,382,607 A | 5/1983 | Voight | |
| 4,399,884 A | 8/1983 | Vandehey | |
| 4,518,053 A * | 5/1985 | Queveau | 180/14.2 |
| 4,834,204 A * | 5/1989 | Ito et al. | 180/415 |
| 4,848,499 A | 7/1989 | Martinet et al. | |
| 4,887,686 A * | 12/1989 | Takei et al. | 180/211 |
| 5,244,226 A * | 9/1993 | Bergh | 280/442 |
| 5,269,389 A | 12/1993 | Tomiyoshi et al. | |
| 5,329,451 A | 7/1994 | Notsu | |
| 5,366,059 A | 11/1994 | Demong | |
| 5,579,228 A | 11/1996 | Kimbrough et al. | |
| 5,607,028 A | 3/1997 | Braun et al. | |
| 5,758,760 A * | 6/1998 | Vergeer et al. | 198/303 |
| 5,911,300 A * | 6/1999 | Mraz | 198/303 |
| 6,016,885 A * | 1/2000 | Hickman et al. | 180/418 |
| 6,062,801 A * | 5/2000 | Cooper | 414/470 |
| 6,129,170 A | 10/2000 | Hickman et al. | |
| 6,167,982 B1 | 1/2001 | Dillon | |
| 6,170,848 B1 | 1/2001 | Wechner | |
| 6,292,094 B1 | 9/2001 | Deng et al. | |
| 7,076,346 B2 * | 7/2006 | Sturges et al. | 701/29 |
| 2001/0054524 A1 * | 12/2001 | Masters et al. | 180/400 |
| 2002/0180178 A1 * | 12/2002 | Masters et al. | 280/426 |
| 2003/0088350 A1 * | 5/2003 | Lin et al. | 701/41 |

* cited by examiner

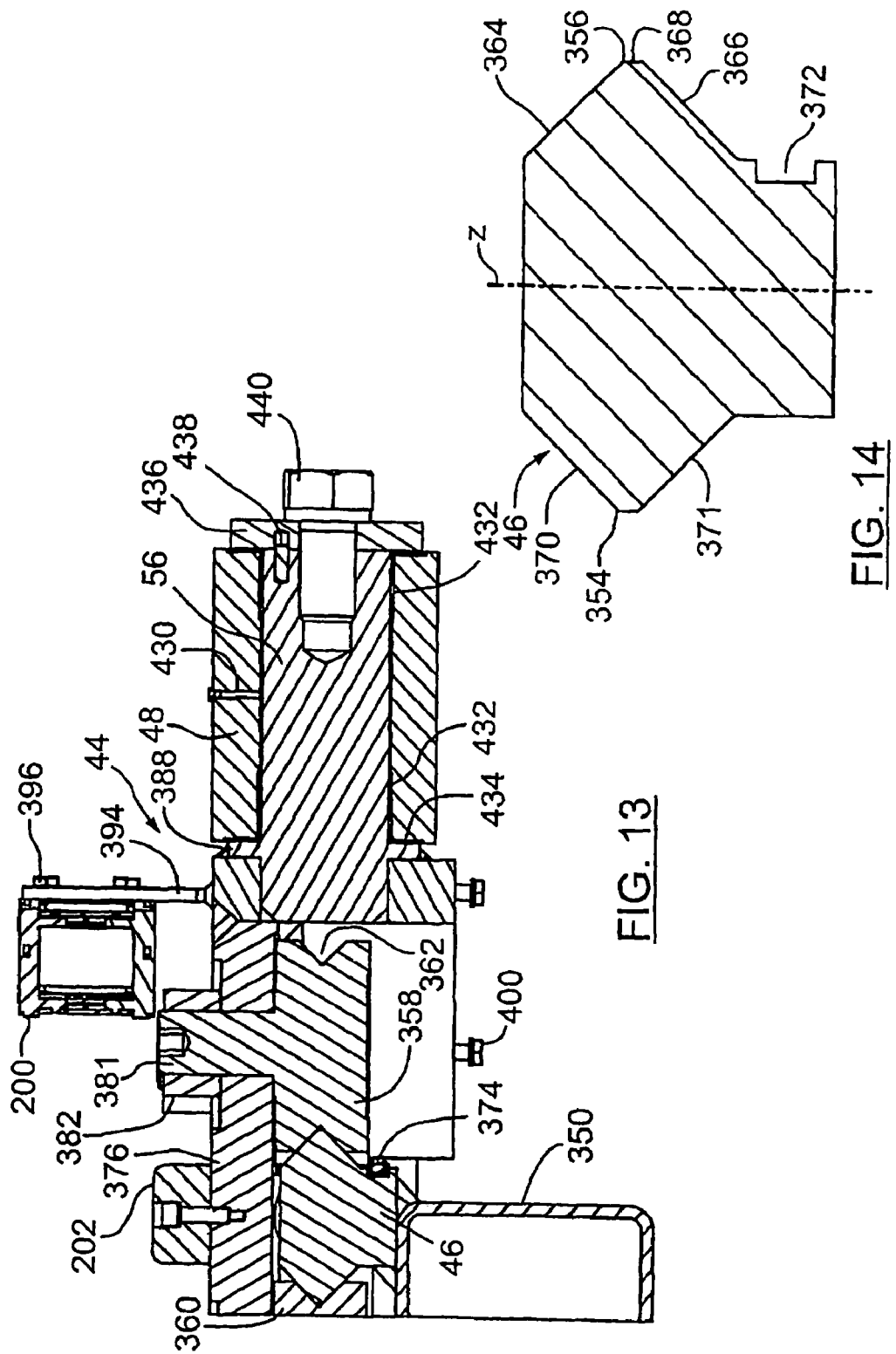

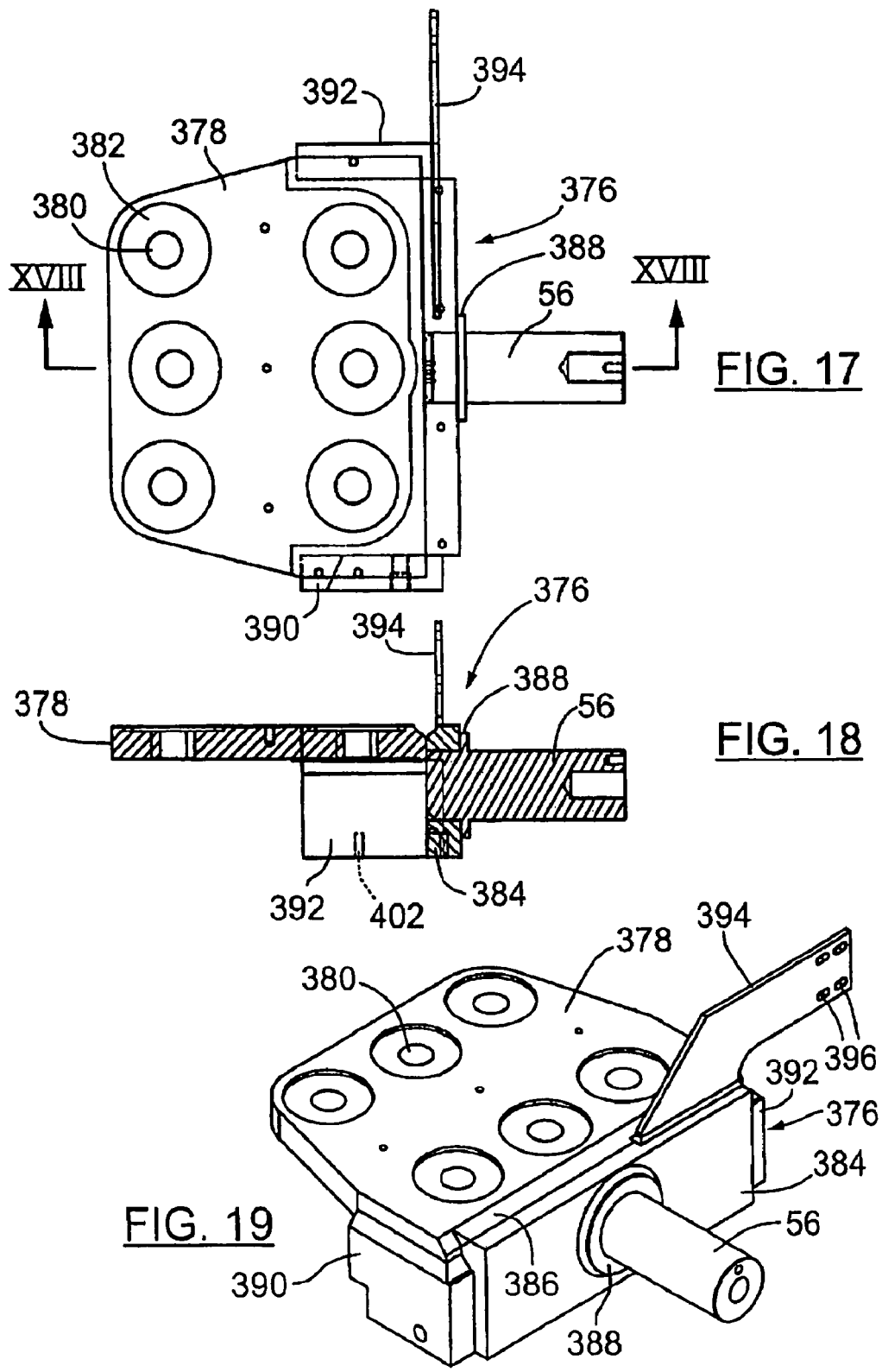

STEERING SYSTEM AND METHOD FOR TRAIN OF WHEELED VEHICLES

This application is a continuation of International application no. PCT/CA2008/000242 filed on Feb. 7, 2008, and claims priority of Canadian Patent Application No. 2,588,161 filed on May 9, 2007.

BACKGROUND OF THE INVENTION

This invention relates to steering systems and methods for a train of vehicles, such as a train of mobile conveyor machines.

Belt conveyors are well known and are efficient means for moving large quantities of materials such as ore, coal and granular stone over a predetermined distance extending either horizontally, vertically or both. One form of conveyor system known for mining applications is a system involving a series of conveyors mounted on wheels so as to make the system easily movable. Because of the manner in which mines are developed and extended, it may be necessary for a relatively long conveyor system to be moved along a substantially curved or zig zag course. Under such circumstances, it can be difficult and time consuming to move the conveyor system when required. It will also be appreciated that it may be necessary to move the conveyor system and to make adjustments to the system fairly frequently as the mining machine advances in a mine.

U.S. Pat. No. 5,366,059 issued Nov. 22, 1994 to Prairie Machine & Parts Mfg. Ltd. describes and illustrates a conveyor system comprising a plurality of conveyor vehicles connected together in the form of a train and also describes a steering system for steering this train of vehicles. All but one of the vehicles in the train has a single pair of steerable wheels with the vehicle at the outby end of the train (that is the end to which the mined material is being delivered) having two pairs of steerable wheels. Hydraulic cylinders are used to steer each of the pairs of steerable wheels and there is a control mechanism for controlling and coordinating these cylinders in order to set the steering angles of the pairs of wheels.

The aforementioned known steering system uses a control system that has sensors for determining the current steering angle for a selected pair of wheels and generating an electrical signal indicative thereof and an electronic memory for storing a series of these electrical signals as the train is travelling. There is also a mechanism for determining the distance the wheels on the train have been travelling. The control system sets the steering angle for each pair of wheels other than the selected pair at substantially the same steering angle that the selected pair had when they were at the location where the respective further pair is located.

One difficulty with this known system is that all of the axles in the train except for first and last axles must be pivotally connected to adjoining vehicles by front and rear pivot devices, each providing a vertical pivot axis. The front pivot device is located forwardly of its respective axle and the rear pivot device is located rearwardly of its respective axle. Furthermore, this steering system requires a mechanism for locking each of the axles (except for the first and last axles) in a position at a right angle to the longitudinal centre line of either the vehicle immediately in front of the respective axle or the vehicle immediately to the rear thereof. Needless to say, this type of pivoting axle system adds substantially to the cost of these conveyor vehicles. Moreover, although it is desirable to provide a conveyor vehicle system which does not require a high mine ceiling in which to operate, this known steering system which requires the use of a series of axles on which to mount the wheels is not particularly desirable from the standpoint of reducing the height of the conveyor system.

There is a need in the mobile belt conveyor industry to provide an improved train of conveyor vehicles which can be easily and reliably steered automatically by an operator, for example an operator located at the leading end of the train of vehicles who is steering a leading set of wheels, that is the pair of wheels at the end of the train towards which the train is moving.

In addition, there is a perceived need to provide a steering system that can be used to steer a plurality of vehicles arranged end-to-end in a train, this train of conveyors being suitable for use in low mining seams, and in particular a steering system for such a train of vehicles that can be used without the need to mount each pair of wheels on a single axle that can be pivoted about a vertical pivot axis.

SUMMARY OF THE INVENTION

According to one aspect of the invention, a steering system capable of steering a plurality of vehicles in a train includes a selected pair of transversely aligned propelling devices, each including a steerable ground engaging wheel and adapted for mounting on opposite sides of one of the vehicles. The system also has a first power actuator mechanism for steering the selected pair of propelling devices as the train moves over the ground and at least two further pairs of transversely aligned propelling devices, each pair including two steerable ground engaging wheels. Each of the further pairs is connected to one or more further vehicles and supports same. Each propelling device of each further pair is adapted for mounting on a respective one of two opposite sides of its respective further vehicle. A second power actuator mechanism is provided for steering each of the further pairs of propelling devices and at least one angle sensor is provided for measuring a selected intercar angle between the or each pair of adjacent vehicles and generating a first electrical signal indicative thereof. The system further includes a controller for controlling each second power actuator mechanism in order to set a steering angle of each of the further pairs of propelling devices. This controller includes a device for indicating distances that the wheels in the train have been travelling from a selected location and mechanisms for determining the current steering angle of each of the selected pair and the at least two further pairs of propelling devices and generating respective second electrical signals indicative thereof. The controller also has means for storing a series of the steering angles of the selected pair measured by the determining mechanisms as the train of vehicles is travelling on a support surface and a system for sending electrical steering signals to the second power actuator mechanisms in order to operate the second power actuator mechanisms and to thereby steer the further pairs of propelling devices. The controller, during use of the steering system, adjusts the current steering angle of each further pair to a desired steering angle on the basis of the distance traveled by the train from the selected location, the determined current steering angle of the respective pair, and the measured intercar angle for the respective pair. The intercar angle for each pair of adjacent vehicles is defined by central longitudinal axes of the respective pair and a pivot point about which one of the respective pair can pivot relative to the other vehicle of the respective pair in a generally horizontal plane.

In an exemplary embodiment of this system, each of the propelling devices includes a hydraulic motor for driving its respective wheel and a non-rotating wheel support structure for detachably connecting the propelling device to a main frame of the respective vehicle, which is a conveyor vehicle.

According to another aspect of the invention, a steering system is provided for at least three vehicles connected together to form a train. Adjacent vehicles in the train are pivotally connected to each other for pivotable movement about a substantially vertical axis and each vehicle has a pair of steerable wheels mounted thereon and supporting the vehicle. These pairs of steerable wheels include a selected leading pair mounted on one of the vehicles located at one end of the train and this leading pair has its steering angle determined by an operator controlling a steering unit of a leading pair. Each pair has an actuator mechanism for steering its respective pair of wheels which are mounted on opposite sides of the vehicle. The steering system includes an electrical controller for automatically steering all of the pairs of wheels trailing behind the leading pair, this controller including a memory unit for storing sensed data. There are also vehicle angle sensors for measuring selected intercar angles between adjacent vehicles, generating first electrical signals indicative thereof, and transmitting these first electrical signals to the controller system. The intercar angle is an angle defined by central longitudinal axes of the respective pair of adjacent vehicles and the substantially vertical axis about which one of the respective pair can pivot relative to the other vehicle of the pair. This system also has a first wheel angle sensor for providing an electrical signal indicative of the current steering angle of the selected leading pair of wheels to the controller. The memory unit is adapted to store a series of the sensed steering angles for the selected leading pair. Each of the stored steering angles corresponds to the steering angle of the leading pair at a series of locations along a path of travel of the train. Additional wheel angle sensors can sense actual steering angles of the pairs of wheels trailing behind the leading pair and provide electrical signals indicative thereof to the controller. The controller during use of the steering system adjusts the actual steering angle for each trailing pair of wheels to a desired steering angle. The controller calculates an adjustment amount for each trailing pair on the basis of the following parameters:

(i) the current distance traveled by the train;

(ii) a respective one of the stored series of sensed steering angles, the controller choosing the respective one of the steering angles representing the steering angle of the leading pair of wheels when the leading pair was at approximately the current location of the respective trailing pair, and (iii) the current intercar angle associated with the respective trailing pair, this associated intercar angle having its defining vertical axis close to the respective trailing pair.

In a particular exemplary embodiment, the steering angle of a respective one of the trailing pairs is only adjusted if the desired steering angle is either greater than a small positive predetermined amount or less than a small negative amount equal to the small positive predetermined amount multiplied by −1.

According to a further aspect of the invention, a method of steering a train of at least three vehicles connected together includes providing a train of at least three vehicles comprising first and second end vehicles and at least one intermediate vehicle, with each vehicle having at least one pair of propelling devices mounted thereon and supporting the vehicle. Each propelling device includes a steerable wheel pivotable about a substantially vertical axis in order to steer the vehicle. The propelling devices of each pair are mounted on opposite sides of the respective vehicle. Each vehicle further includes a power steering mechanism for pivoting the wheels of the pair about their respective vertical axes and a controller for operating the power steering system in order to steer the vehicle. Adjacent vehicles of the train are pivotally connected to each other for pivotal movement about a substantially vertical vehicle pivot axis. The method includes causing the train to move over ground in a desired direction towards one of the end vehicles and steering a leading pair of the wheels on the one end vehicle to a desired steering angle. This desired steering angle is sensed on a continual or frequent periodic basis and first signals are provided which are indicative of these steering angles to the controller. A series of these desired steering angles is stored as the train is moved over the ground. The current steering angle for each pair of wheels trailing the leading pair of wheels relative to the direction of travel of the train is also sensed on a continual or frequent periodic basis. An indication of the distance traveled by the train from a selected location is provided to the controller. Also readable indications of intercar angles between pairs of adjacent vehicles are provided to the controller. Each intercar angle is defined by central longitudinal axes of a respective pair of the vehicles and the vehicle pivot axis of the respective pair. Steering angle corrections are calculated for trailing pairs of the wheels by means of the controller as the train is moving, these steering angle corrections being a function of the following:

(i) the distance traveled by the train of vehicles;

(ii) the stored desired steering angles of the leading pair of vehicles with the controller selecting a stored steering angle for each trailing pair that represents the desired steering angle when the leading pair of wheels was at about the same location where the respective trailing pair is currently located;

(iii) the current intercar angle associated with the respective trailing pair, this associated intercar angle having its defining vertical axis located between the respective trailing pair; and (iv) the current steering angle of each pair of wheels trailing the leading pair of wheels.

In an exemplary version of this method, the controller includes a programmable logic controller (PLC) on each of the vehicles, these PLCs including a master PLC and a plurality of intelligent slave PLCs.

These and other aspects of the disclosed steering system and steering method for steering a plurality of vehicles in a train, and in particular a train of conveyor machines will become more readily apparent to those having ordinary skill in the art from the following detailed description taken in conjunction with the accompanying drawings.

BRIEF DESCRIPTION OF THE DRAWINGS

In the drawings,

FIG. 13 is a vertical cross-section taken along the line XIII-XIII of FIG. 15 illustrating how the rollers of the hitch unit engage the curved track;

FIG. 14 is a detail view showing the transverse cross-section of the curved track according to an exemplary embodiment;

FIG. 17 is a top view of a roller mounting support body which is part of the hitch unit;

FIG. 18 is a vertical cross-section of the roller mounting support body taken along the line XVIII-XVIII of FIG. 17;

FIG. 19 is a perspective view of the roller mounting support body of FIG. 17 taken from above and from its pivot pin end;

DETAILED DESCRIPTION OF THE INVENTION

Figure 29:
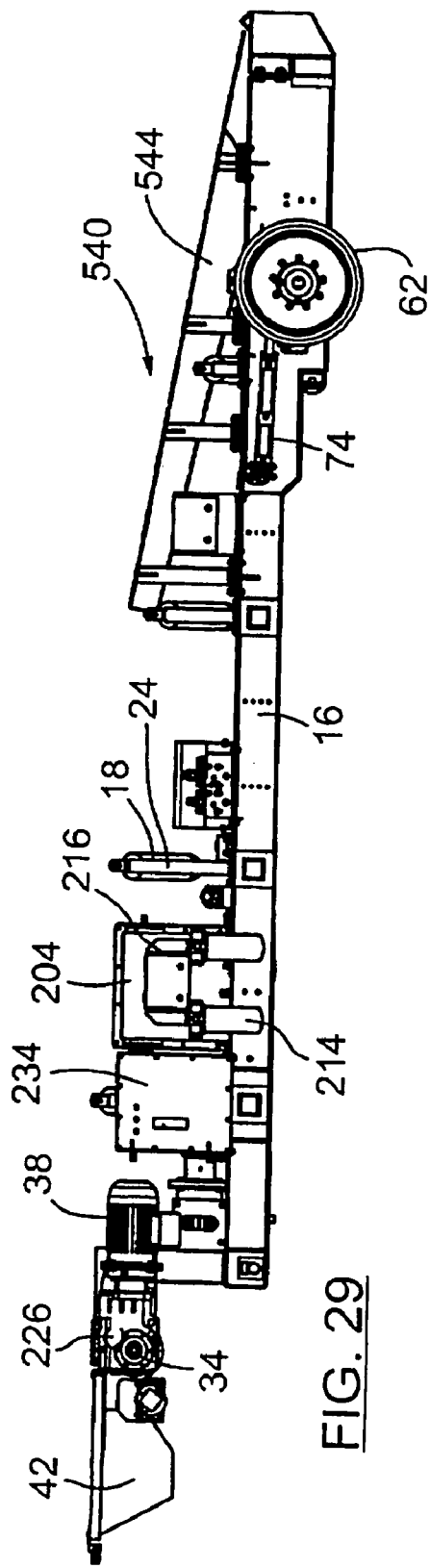
FIG. 29 is a side elevation of a loading car vehicle which can be provided at a loading end of a train of conveyor vehicles.

Major components of an intermediate conveyor vehicle, which can be steered with the present steering system and method along with other vehicles connected thereto, are illustrated in FIGS. 1 to 5 of the drawings. The illustrated, low profile intermediate conveyor vehicle 10 has been shown without the usual flexible conveyor belt, the location of which is only indicated in chain-link lines in FIG. 1 for sake of illustration. This conveyor belt 12 is an endless conveyor belt and can be of standard construction depending upon the type of material being conveyed by the conveyor system. The illustrated exemplary vehicle is intended for use as an intermediate conveyor car of which there may be five, ten or more in a train of conveyor vehicles similar to the train illustrated and described in U.S. Pat. No. 5,366,059. It will be understood that in addition to a plurality of intermediate conveyor vehicles pivotably connected end-to-end, there can also be a loading conveyor vehicle 540 shown in FIG. 29 which is located at the end of the train adjacent the mining machine, and a discharge conveyor vehicle 542 shown in FIGS. 30 and 31 located at the opposite end of the train which is referred to as the outby end, that is, the end to which the train of vehicles delivers the material. The loading car assembly 540 can be constructed in a similar manner to the illustrated intermediate car assembly 10, except that it need not be provided with a hitch mechanism at its inby or hopper end, since there is no need to attach this end to another conveyor vehicle. Also the loading car normally has a larger hopper 544 to receive the ore from the mining machine. As for the discharge conveyor vehicle 542, it is provided with two pairs of transversely aligned wheel units 546, 548 rather than a single pair of these wheel units described hereinafter. However, the wheel units on the discharge car can be constructed in the same manner as described hereinafter, including their steering mechanism and their hydraulic drive mechanism. The discharge car is also provided with a pivotable cross-conveyor 550 for discharging the material onto a permanent or fixed conveyor in the mine. A cross-conveyor and its use is described and illustrated in U.S. Pat. No. 5,366,059. A detailed description of its cross-conveyor herein is deemed unnecessary as cross-conveyor systems are well known in the mobile conveyor industry.

Turning now to the intermediate conveyor vehicle 10, this vehicle has a conveyor mechanism 14 that includes an elongate, substantially horizontal frame 16 and a series of spaced apart conveyor roller devices 18 mounted on the horizontal frame 16 and adapted to support rotatably an upper run of the continuous conveyor belt 12 extending between opposite end sections of the vehicle. The roller devices 18 can be of standard construction available from conveyor parts suppliers. Each illustrated roller device comprises three metal rollers 20 which are pivotably connected together in an end-to-end fashion by their central shafts. The outer end of each outer roller is connected by a chain 22 (see FIG. 5) to a vertical support post 24 mounted on a main, longitudinally extending frame member of the main frame 16. The height of each pair of posts 24 varies as shown to gradually increase the height of the roller devices. In addition to the cylindrical, rotatable metal rollers 20, there can also be provided impact rollers 26 of known construction positioned below a U-shaped hopper member 28. It will be understood that the impact roller helps to absorb the impact of material dropping onto the conveyor belt at this location.

The conveyor mechanism 14 further includes a tail pulley unit mounted adjacent one end of the conveyor mechanism on the horizontal frame 16 and having a rotatable tail pulley indicated at 32. Further details of the construction of the tail pulley unit are provided hereinafter with reference to FIGS. 5 and 26. The conveyor mechanism 14 further includes a head pulley unit 34 mounted adjacent the second end of the conveyor mechanism opposite the first end where the tail pulley is located. The head pulley unit includes a rotatable head pulley 36 which, in a known manner, can be provided with a gripping cylindrical surface which enables the head pulley unit to drive the conveyor belt 12. There is also an electric motor mechanism 38 which can be considered part of the head pulley unit since it rotates the head pulley 36 to move the conveyor belt and thus to transport material from the tail pulley to the head pulley. A belt scraper 40 of known construction can be mounted adjacent to the head pulley to help keep the conveying surface of the belt clean. Mounted adjacent to the head pulley at the outby end of the vehicle is a material hopper 42 which helps direct the material onto the conveyor belt of the next conveyor vehicle of the train. In order to provide a conveyor vehicle 10 having a low profile, there is provided a pivoting hitch mechanism 44 at the inby end of the vehicle. This hitch mechanism includes a curved steel track and a rolling hitch device 48 having two sets of grooved rollers located at 50 and 52 on two opposite V-shaped sides of the track 46. Two car hitch pins 54 are located on opposite sides of the hitch device 48 which is able to pivot about a central longitudinal axis of the vehicle by mean of central pivot pin 56 (see FIG. 13). Located near the opposite head pulley end of the car are two hitch pin holders 60, one on each side of the frame 16.

Figure 7:
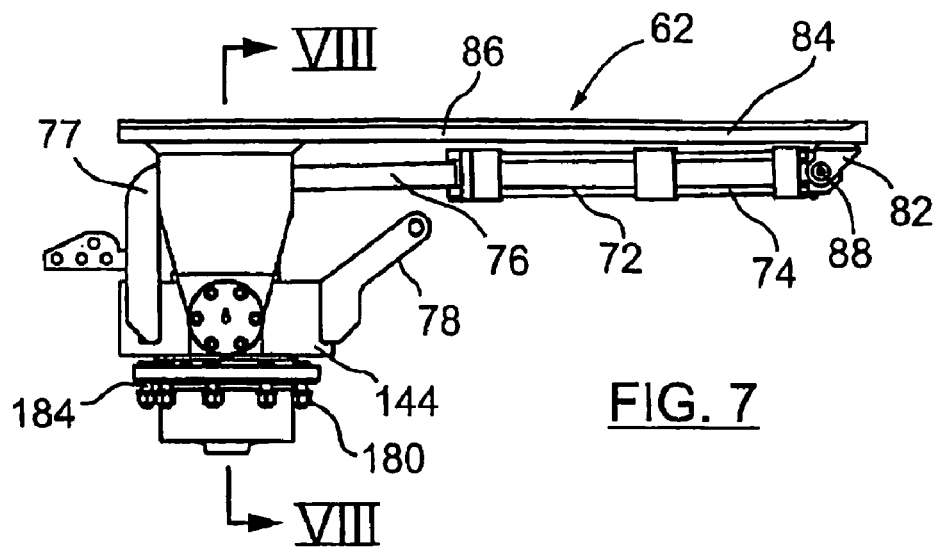
FIG. 7 is a detail top view of a left hand wheel unit assembly of the vehicle of FIGS. 1 and 2, this view omitting the wheel itself for sake of illustration.

The conveyor vehicle 10 has a pair of transversely aligned wheel units indicated generally at 62 for supporting and moving the conveyor vehicle. Each of these wheel units is separately connected to the horizontal frame 16 including any extension thereof. In particular, each wheel unit is connected to a respective longitudinally extending side of the frame. Each wheel unit has its own solid wheel with the wheel on the left side indicated at 64 and the wheel on the right hand side indicated at 66. As explained more fully hereinafter, each wheel 64, 66 is mounted for pivotable movement about a substantially vertical pivot axis for steering purposes, that is, to steer the vehicle 10. In an exemplary embodiment of the conveyor vehicle, each wheel unit includes a standard hydraulic motor 68 shown clearly in FIG. 8. This motor is used to rotate or drive the wheel of the respective wheel unit. Also, each wheel unit includes a non-rotating wheel support structure indicated generally at 70 for detachably connecting the wheel unit to the horizontal frame, including any extension of this frame. The left hand wheel unit 62, with its wheel removed, is illustrated in FIG. 7 and is illustrated with its wheel in FIGS. 8 and 9. FIG. 7 also shows a power steering mechanism or power steering means 72 for steering the wheel of this wheel unit. The illustrated power steering mechanism includes a hydraulic linear actuator having a hydraulic cylinder 74 and an actuator rod 76 slidable in the cylinder. A steering arm 77 having a L-shape is rigidly attached at one end to an upper section of a motor support member 144 (see FIG. 12) and is pivotably connected at its other end to the rod 76 by means of a bolt and nut 80 (see FIG. 9). The closed end of cylinder 74 is pivotably mounted by means of lugs 82 to an end of a horizontally extending, elongate arm section 84 which is part of a wheel unit mounting plate 86. A nut and bolt combination 88 pivotably connects a short connecting plate 90 that is rigidly attached to the end of the cylinder to the lugs 82. The actuator rod 76 can be provided with a spherical bearing 92 that is connected by threads to the outer end of the rod. This bearing is connected to the steering arm 77 by the nut and bolt 80. Each hydraulic linear actuator 72 in an exemplary embodiment includes means for determining the current steering angle of the pair of wheels and for providing an electrical signal indicative thereof to the PLC for the vehicle. In one particular embodiment, the steering angle sensor is a linear position sensor sold under the trade name Positek, this sensor being indicated at 75 in FIG. 33. This sensor is mounted in the hydraulic cylinder 74 and the size of the signal generated is dependent on the amount of extension of the rod 76.

Figure 6:
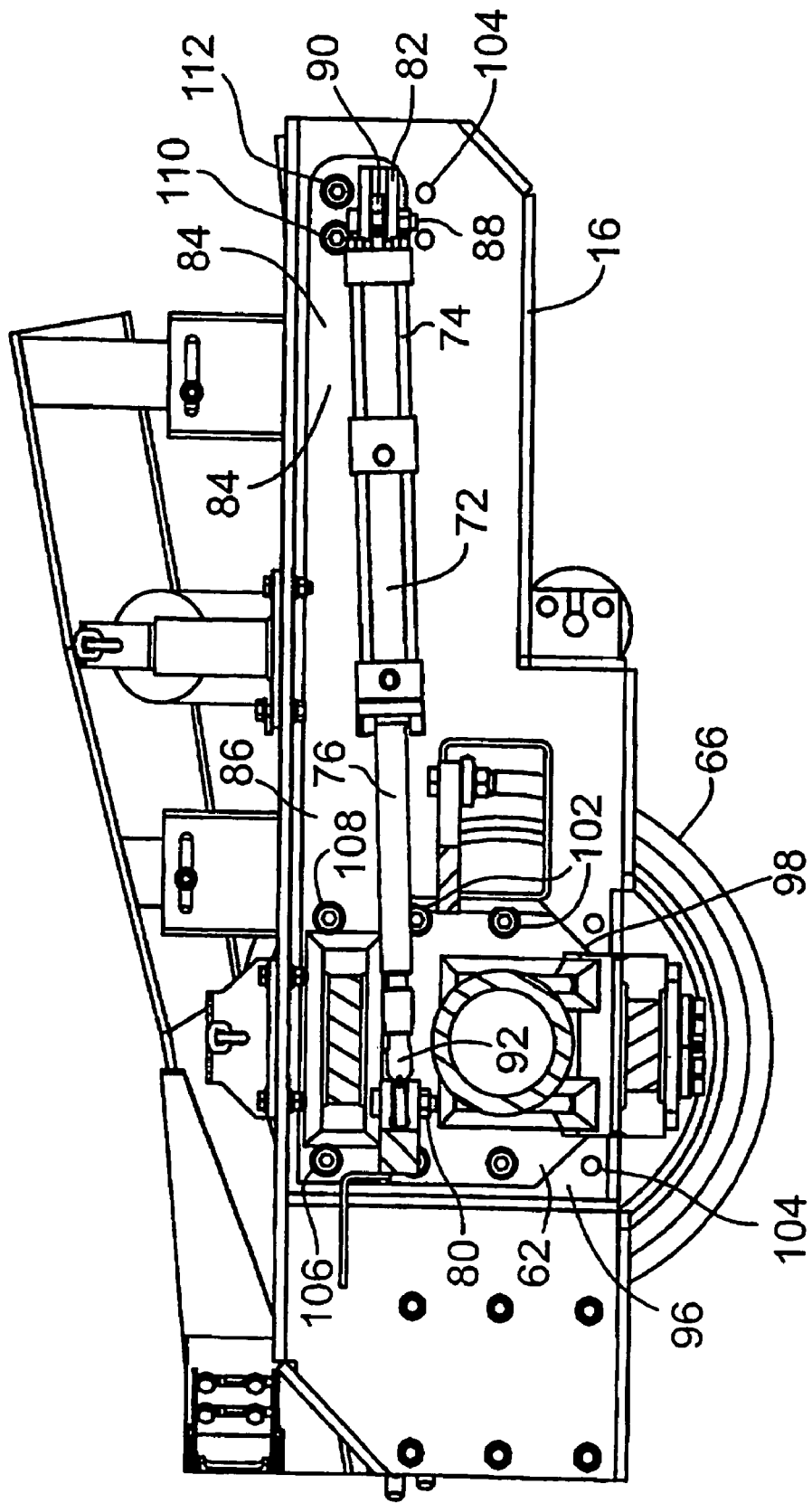
FIG. 6 is a sectional elevation taken along the line VI-VI of FIG. 1, this view showing details of the power steering arrangement for each wheel.

In addition to the arm section 84, the flat mounting plate 86 includes a main plate portion 96 shown in FIG. 6. This main plate portion has a generally rectangular shape except for cut-off bottom corners 98. The arm section 84 extends horizontally from an upper corner of the main plate portion 96. An advantage provided by the arm section 84 is that the hydraulic cylinder can then be pivotably mounted to the same mounting plate 86 as the wheel and its hydraulic motor 68. As can be seen from FIGS. 6 and 11, each wheel unit 62 and, in particular its mounting plate 86 (which is part of the wheel support structure), is formed with a plurality of apertures or holes indicated generally by reference 100 which are provided to receive fasteners, preferably bolts, used to attach the respective wheel unit to the frame 16, including any extension thereof. A plurality of fasteners 102 for this purpose are insertable through spaced-apart apertures 104, four of which can be seen in FIG. 6. There are a plurality of the apertures 104 formed in each longitudinally extending side of the frame 16 and optionally additional apertures can be provided in extension plates attachable to the main frame members. The apertures 100 formed in the mounting plate 86 are located in opposite end sections of the mounting plate as clearly shown in FIG. 11. The illustrated aperture arrangement permits the height of each wheel unit relative to the horizontal frame 16 to be adjusted between either one of two possible positions, but it will be appreciated by those skilled in the art that by providing further apertures 104, for example, on each longitudinal frame member or an extension plate, it is possible to provide for more than two possible height positions for each wheel unit. In the position of the wheel unit illustrated in FIG. 6, the wheel unit 62 is at its maximum height relative to the frame 16. In this position, the overall height of the conveyor vehicle will be a minimum height which, in an exemplary embodiment, is only four feet or forty-eight inches as compared to earlier conveyor vehicles such as those described and illustrated in U.S. Pat. No. 5,366,059 which had an overall height of six feet or seventy-two inches. In this position of the wheel units in the exemplary embodiment, the ground clearance provided under the vehicle is six inches. However, in the event that mining conditions require greater ground clearance and provided the mine area has an adequate ceiling or working height for the conveyor system, the wheel units can be moved to the second position which can provide an additional four inches of ground clearance for a total of ten inches. In this case, the overall height of the conveyor vehicle is fifty-two inches.

Figure 8:
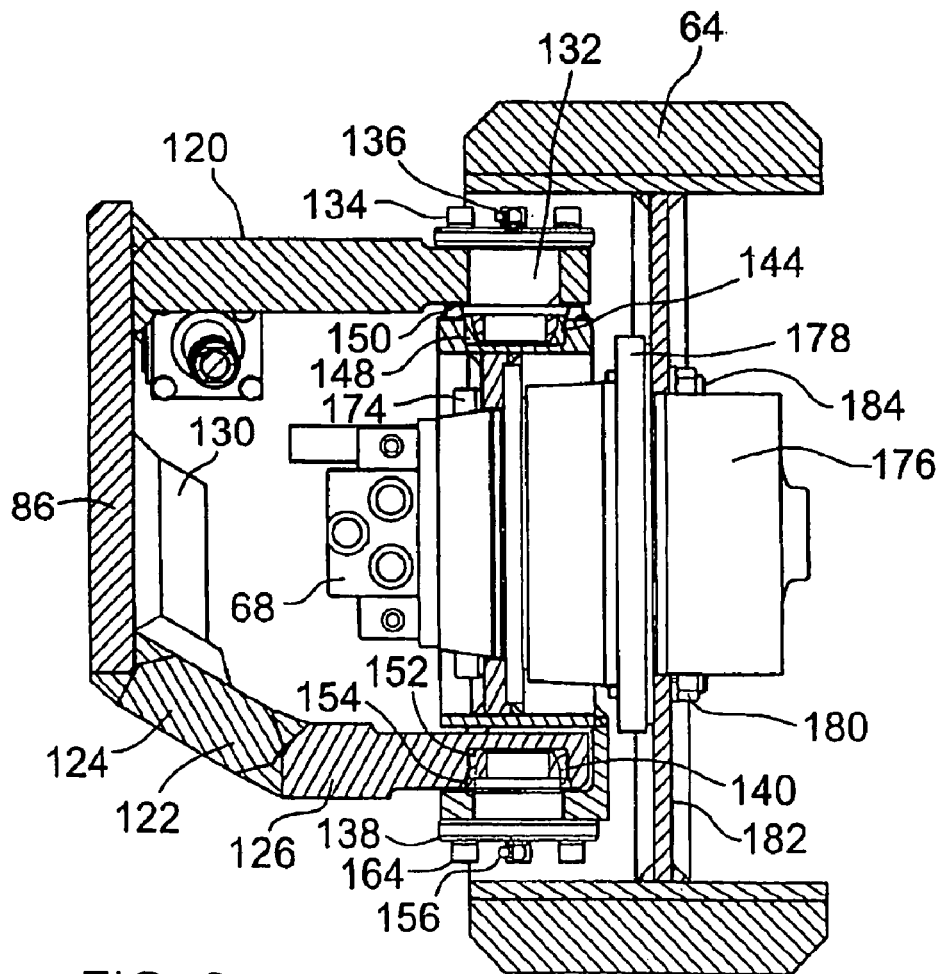
FIG. 8 is a detail sectional elevation taken along the line VIII-VIII of FIG. 7.
Figure 9:
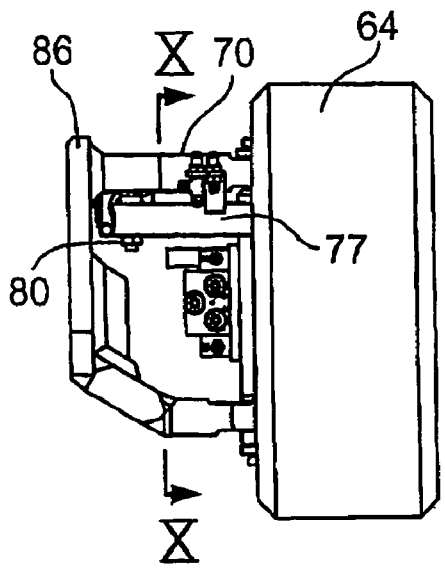
FIG. 9 is a detail end view of the wheel unit assembly of FIG. 7, this view being taken from the left side of FIG. 7 and showing the wheel mounted on the assembly.
Figure 11:
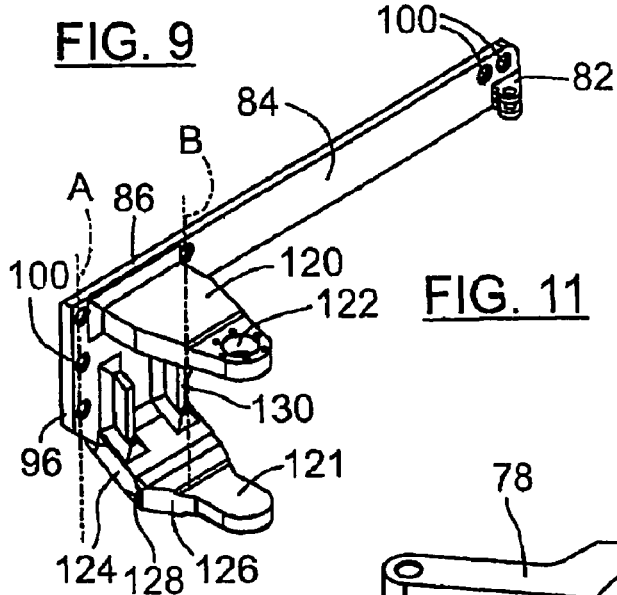
FIG. 11 is a perspective detail view of a mounting plate weldment used to support each wheel and its hydraulic motor.

Turning now to the wheel support structure 70, shown in FIGS. 8 and 11, the wheel support structure includes upper and lower, horizontally extending wheel supporting arms 120, 122, both with rounded distal ends. The upper arm 120 can be formed from a single steel plate welded to the top of mounting plate 86 and is formed with a round hole 122 to receive an upper pivot pin member. As illustrated, the lower support arm 122 can be constructed of two short plate members 124, 126 which are welded together at 128 and which extend at an obtuse angle to one another as shown in FIG. 8. The strength and rigidity of the connection between the sloping plate 124 and plate 86 can be strengthened by two vertically extending gussets 130 which are welded to these plates. A top pivot pin 132 is mounted in the hole 122 and is connected to the upper arm 120 by six screws 134. The pivot pin can be provided with a central passageway (not shown) that extends downwardly from grease zerk 136. There is also a bottom pivot pin 138 having a reduced top end extending into a circular recess 140 formed in the rounded end section of the lower support arm 122.

Figure 12:
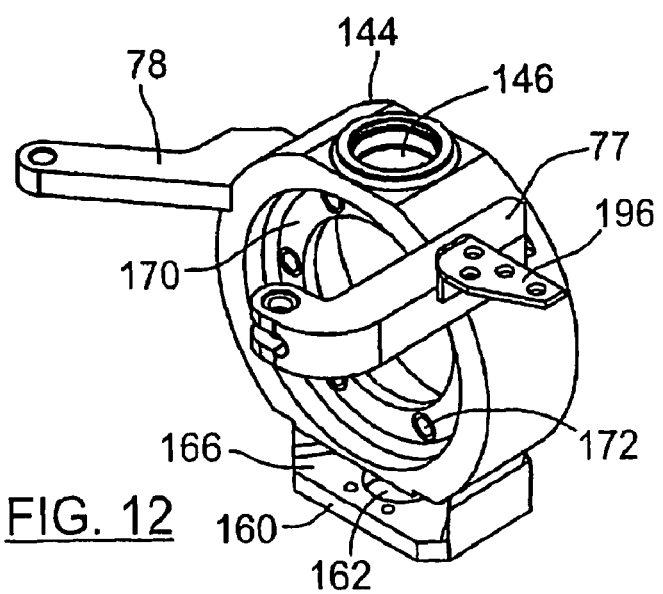
FIG. 12 is a detail perspective view illustrating a pivotable motor support member mounted adjacent each wheel.

In order to pivotably support the wheel and its hydraulic motor 68, there is provided a substantially annular motor support member 144 shown in FIG. 12. This support member has a circular recess 146 formed on its top side and into this recess a reduced bottom end section of the top pivot pin 132 extends. Mounted in this recess is a spherical angular contact bearing 148 which, in one embodiment, has a bore measuring 1¾"and has an outside diameter of 2¹³⁄₁₆ inch. Protecting this bearing and extending around the top edge of the bearing is a suitable seal such as a Chesterton Super Wiper seal 150. Similarly, extending around a reduced upper portion of the bottom pivot pin is a spherical angular contact bearing 152 which is sealed by means of a Chesterton super wiper seal 154. The bottom pivot pin can be greased through grease zerk 156.

Returning to FIG. 12, it will be seen that the motor support member 144 has a bottom extension 160 which is welded to the annular portion of the support member 144 and which has a circular hole 162. The bottom pivot pin projects through the hole 162 from the bottom and is detachably connected to the extension 160 by six screws 164 which extend through a flange extending around the bottom of this pivot pin. Formed between the extension 160 and the annular portion of support member 144 is a cavity 166 which receives the rounded end portion of the horizontal plate 126. In this way, the support member 144 is pivotably supported from below.

Figure 10:
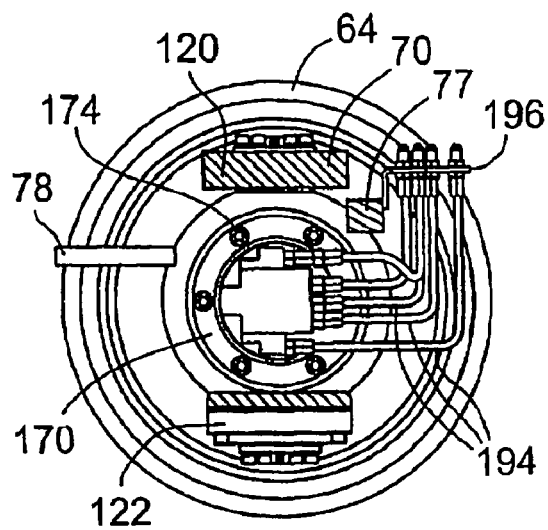
FIG. 10 is a detail sectional elevation taken along the line X-X of FIG. 9.

It can also be seen from FIG. 12 that the support member 144 has a radially inwardly extending connecting flange 170, this flange being formed with a series of fastener holes 172. As shown in FIG. 10, six screws 174 can be used to attach the hydraulic motor 68 to the flange 170 along with its associated planetary gear box 176. The planetary gear box has an annular rotating flange 178 which is attached by nine hex nuts 180 to a circular plate 182 forming a central portion of the hub of the wheel. The nuts are threaded onto studs 184 visible in FIG. 7, these studs extending through the rotating flange on the gear box. It is understood that the left and right wheels 64, 66 are solid rubber wheels and, in one embodiment, each wheel measures 10"×24" in diameter. The left and right wheels 64, 66 are connected by a steering tie rod 190 shown in FIG. 4 which ensures that the wheels pivot in the same way at the same time. It is connected at each end to the tie rod arm 78 of the respective wheel by means of a bolt with a nylon insert lock nut 192.

It will be understood that the hydraulic motor for each wheel unit is provided with pressurized hydraulic fluid through hydraulic lines and fittings of standard construction which are readily available and well known in the art. Most of these lines are not shown for ease of illustration. Some of these lines are indicated at 194 in FIG. 10. Connecting fittings for these lines can be supported by a small bracket 196 shown in FIG. 12. It will be understood that the hydraulic motor itself and its gear box are of standard construction and accordingly a detailed description herein is deemed unnecessary.

Figure 1:
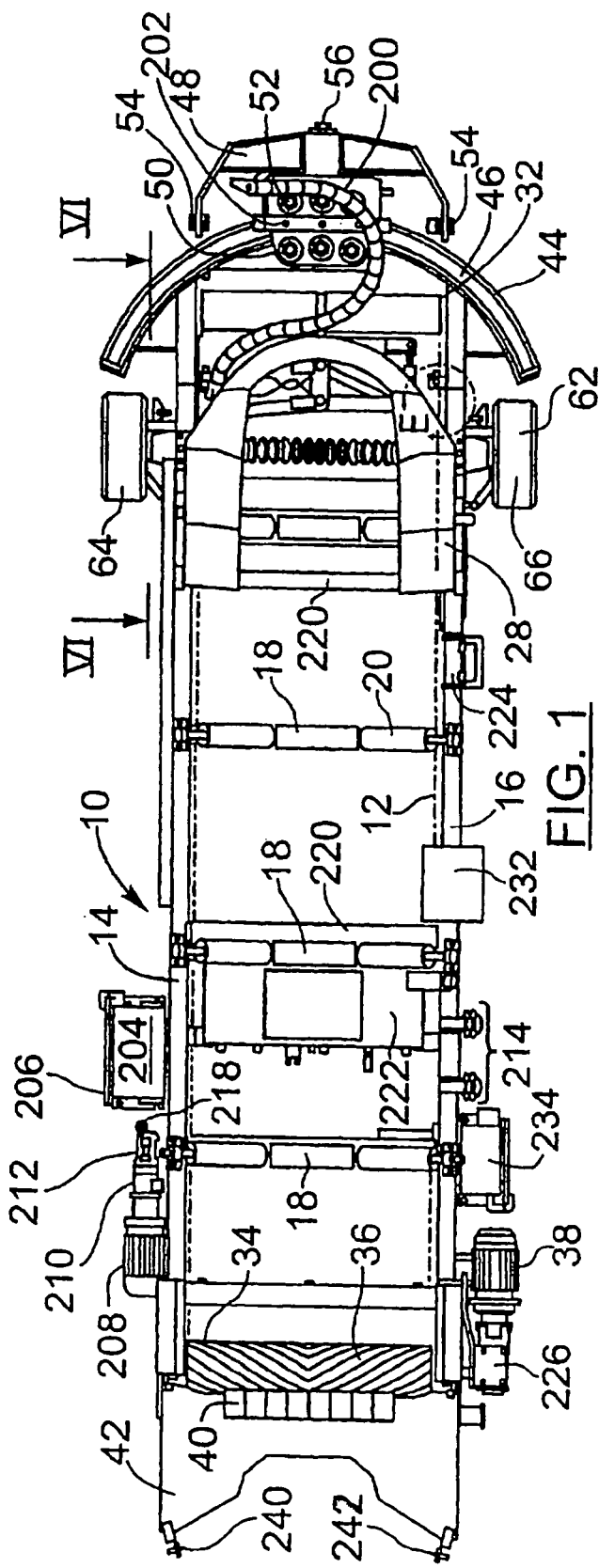
FIG. 1 is a top view of an exemplary embodiment of an intermediate mobile conveyor machine or vehicle steerable with the steering system of the present invention.
Figure 2:
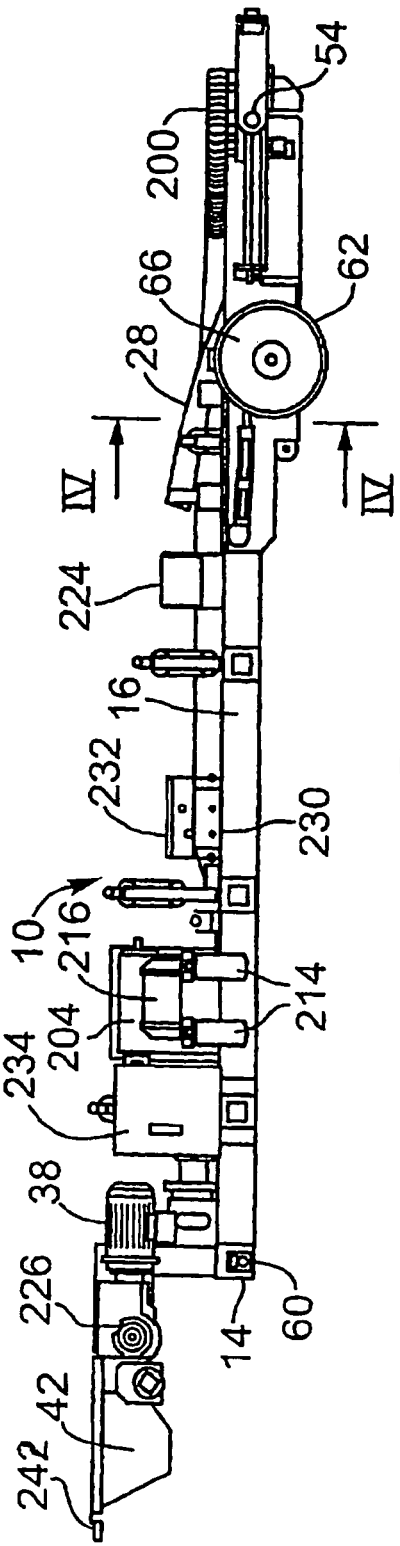
FIG. 2 is a side elevation of the intermediate conveyor vehicle of FIG. 1.
Figure 3:
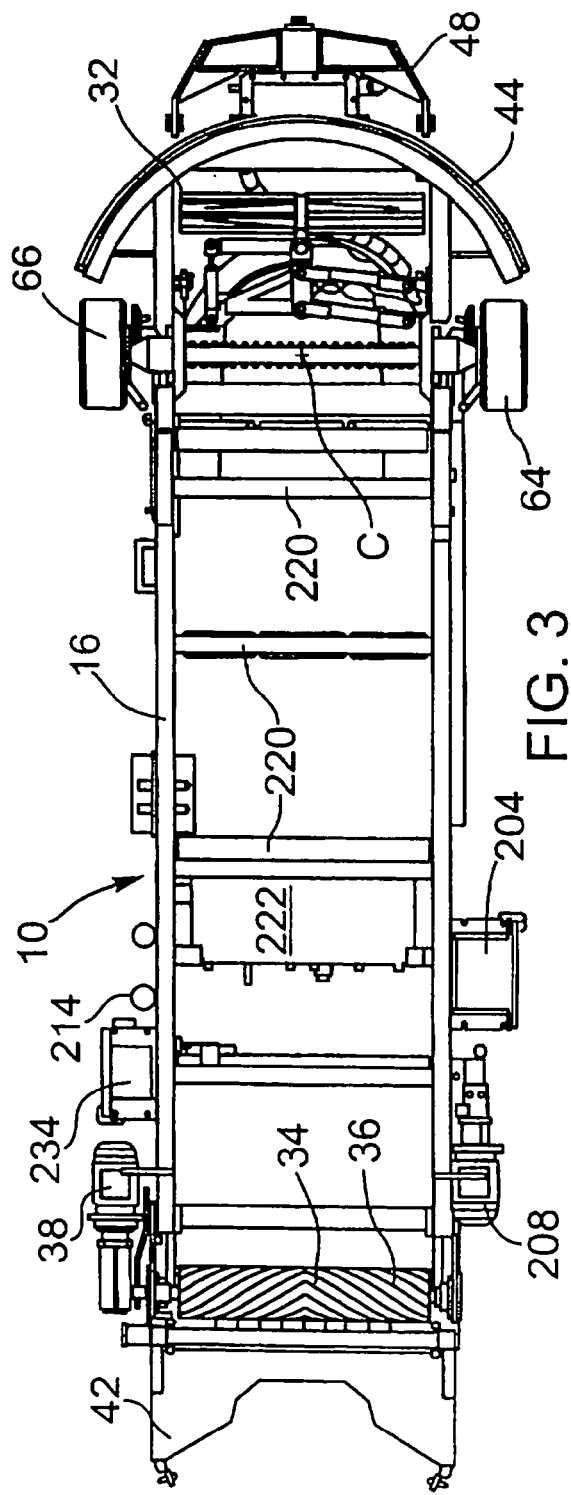
FIG. 3 is a bottom view of the conveyor machine of FIGS. 1 and 2.
Figure 4:
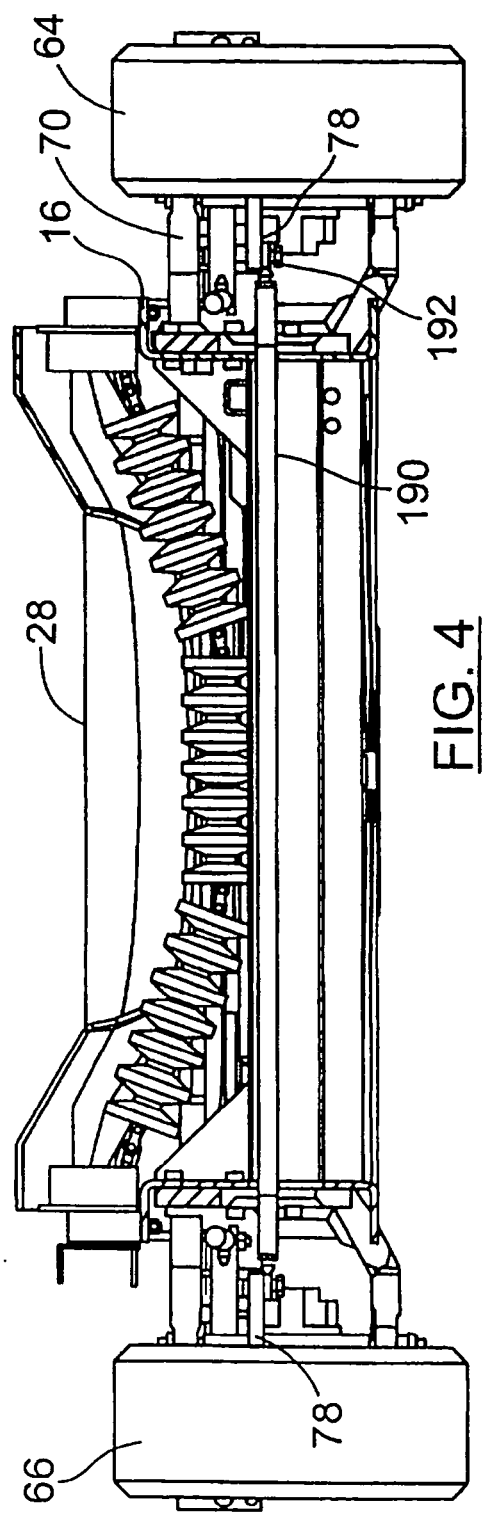
FIG. 4 is a sectional elevation taken along the line IV-IV of FIG. 2.
Figure 5:
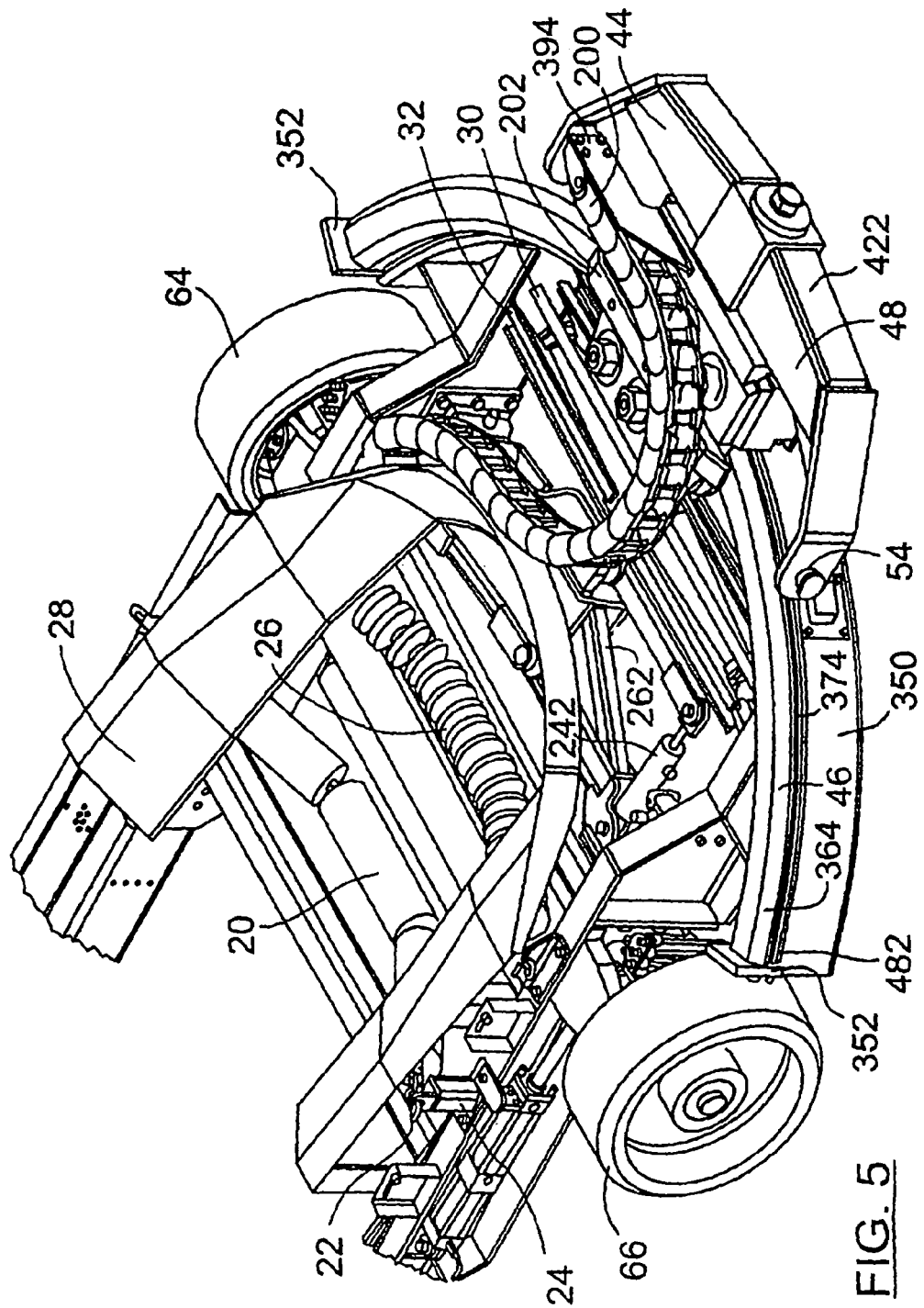
FIG. 5 is a perspective view taken from above and from the tail pulley end of the conveyor machine, this view showing an end section of the machine including its two wheels.

Various other features in the illustrated exemplary low profile conveyor vehicle that are shown in FIGS. 1 to 3 include a plastic energy chain 200 through which electrical cables and wires are fed for the operation of the vehicle and an energy chain guide 202 which helps to support the movement of the energy chain. Mounted to the frame on the left side is an electrical power box 204 of standard construction, this box having an access door 206. Mounted to the same side of the frame is an electric motor 208 which powers first and second hydraulic pumps 210 and 212, the first pump 210 being used to drive the hydraulic motors for the wheels and the second motor 212 being used to power other hydraulic components on the vehicle. Two standard filters for the hydraulic system are provided at 214 on the right side of the vehicle. Mounted above these filters is a junction box 216. A third hydraulic filter can be provided at 218 adjacent the pump 212. On or between the two longitudinal main frames of the frame 16 and adjacent one of the cross-frames 220 is a hydraulic fluid reservoir 222. Another junction box for electrical components including connectors is provided on the right side at 224. The side mounted electrical motor 38 for the head pulley is connected to a conveyor gear box 226 which has an output shaft connected to the shaft of the head pulley. In one embodiment, the motor 38 is a 7.5 kwatt or 10 hp motor. Also on the right side of the vehicle there is mounted to the longitudinal frame member a hydraulic assembly manifold 230 which is protected by a shroud or guard 232. On the same side of the frame near the motor 38 is a control box containing a programmable logic controller for controlling the operation and steering of the vehicle, the box indicated at 234. In a known manner, the vehicle 10 can also be provided with water sprayers, two of which are indicated at 240, 241. Water hoses (not shown) are connected to the sprayers to reduce dust levels generated by the conveyor system.

Figure 15:
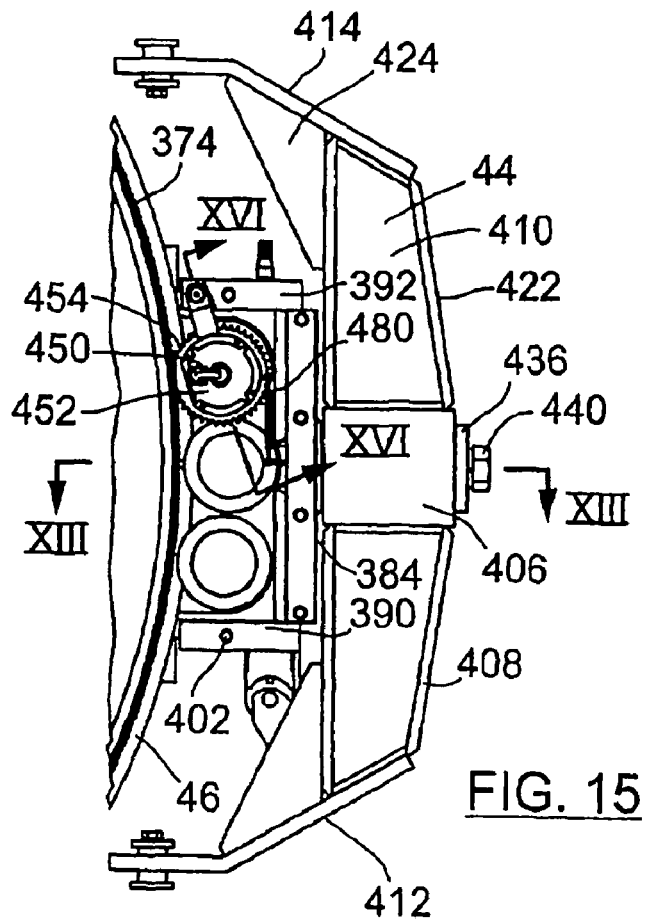
FIG. 15 is a bottom view showing a portion of the curved track and the hitch unit mounted for rolling movement on the track.
Figure 16:
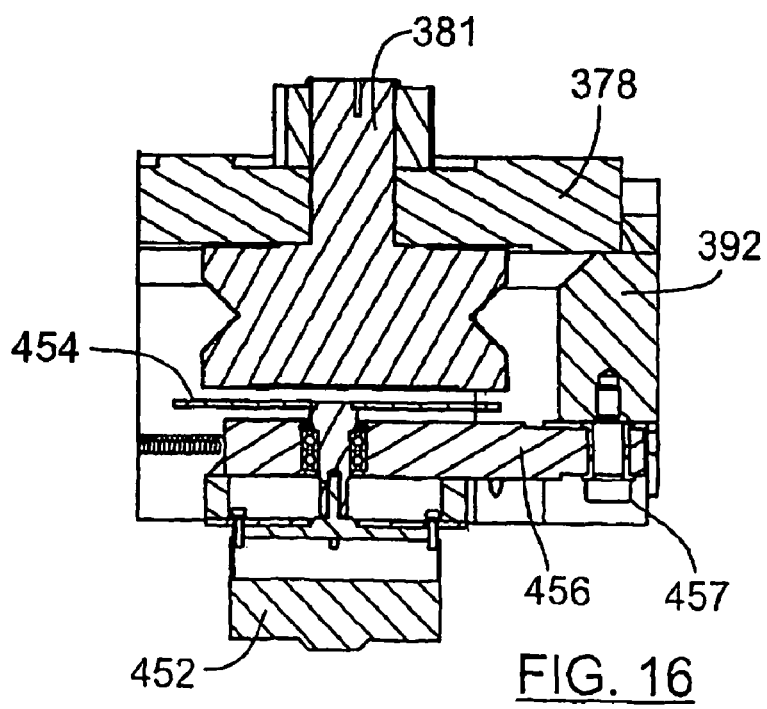
FIG. 16 is a vertical cross-sectional detail taken along the line XVI-XVI of FIG. 15.

FIGS. 13 and 15 illustrate the pivot mechanism or pivoting hitch mechanism 44 for pivotably connecting the mobile conveyor machine of FIGS. 1 and 2 at its inby end (also sometimes referred to herein as its first end) to an adjacent end section of another mobile conveyor machine which can be constructed in the same manner as the machine or vehicle of FIGS. 1 and 2. As indicated above, this pivot mechanism includes the curved track 46 which can be of uniform transverse cross-section and, in an exemplary version, has the cross-section illustrated in FIG. 14. The curved track is bent in a horizontal circular arc as clearly shown in FIG. 5, for example, and this arc has a center of curvature located midway between the propelling devices, that is the wheels 64, 66. This center of curvature is indicated at C in FIG. 3. The center of curvature is on a common axis of rotation for the two wheels when these two wheels are positioned to move the conveyor mechanism in a straightforwards direction. This axis of rotation is indicated at A in FIG. 26. The track is rigidly mounted on the supporting frame 16 which includes a curved bumper frame 350 having a rectangular transverse cross-section, this frame extending the length of the track. The track, which is preferably made of machined solid steel, can be welded to the bumper frame. Each end of the track can be fitted with a rectangular stop plate 352 secured in place by screws (for example, three screws) threaded into holes formed in each end of the track. This plate 352 can be provided with an additional hole (not shown) to secure its respective end of a roller chain 374 (described below). An exemplary form of the track has a cross-section such as that shown in FIG. 14. The track has two opposite roller engaging sides 354, 356, with the side 354 being on the inner side of the track and forming a concave curve and the side 356 being on the outer side and forming a convex curve. Each of these sides in the exemplary illustrated version engages three rollers with one of the rollers engaging the side 356 being shown in cross-section at 358 in FIG. 13. Another roller 360 is shown in part in FIG. 13 and this is one of the three rollers engaging the side 354. The three rollers engaging the side 356 form a first set of rollers and the three rollers engaging the side 354 form a second set of rollers. It will be seen that the track 46 is captured and held between the first and second set of rollers. The rollers of both sets have V-grooves 362 formed about their circumferences. The use of three rollers in each set helps keep the hitch unit correctly oriented on the track at all times.

Turning now to the exemplary cross-section illustrated in FIG. 14, the outer convex side 356 which faces towards an adjacent end of the mobile conveyor machine has an upper sloping surface 364 which extends at a 45° angle to the vertical centerline Z of the track. The outer surface also has a lower sloping surface 366 which extends at a 45° angle to the axis Z and there can be a short vertical surface provided at 368. The inner roller engaging side 354 is similarly shaped with 45° sloping surfaces at 370 and 371. These surfaces can be formed by a standard machining process. Also formed in the track member is a rectangular groove 372 which can extend the length of the track member on the side 356. The purpose of this groove is to accommodate a length of roller chain 374 used in conjunction with an angle sensor described hereinafter.

Turning now to the construction of a roller mounting support body 376 illustrated in FIGS. 17 to 19, this body is used to rotatably support the aforementioned two sets of rollers which engage the track 46. This body includes a horizontally extending support plate 378 which can have a generally trapezoidal shape and is formed with six circular holes 380 which accommodate upwardly extending shafts 381 of the rollers. If desired, a shallow circular recess 382 can be formed around each hole to partially accommodate a nut 382 which is shown in FIG. 13 and threaded onto the roller shaft by suitable threads (not illustrated). Each roller unit is a standard roller and therefore has not been shown in detail. The support body also has a vertical pivot pin support plate 384 which is fixedly connected to an edge of the roller support plate 378. The two plates can be welded together at 386. The horizontally extending, central pivot pin 56 is mounted in a circular hole formed centrally in the support plate 384. The pin 56 is formed with a circumferential flange 388 near its inner end, this flange resting against the support plate 384. The inner end of the pivot pin can be welded to the plate 384. To strengthen the support body 376 two rectangular side plates can be welded thereto at 390, 392. A support plate 394 can be welded to the top edge of the plate 384 and is shaped to form an obtuse angle. Four fastener holes 396 can be formed in the outer end of this support plate. The arm 394 is used to detachably connect one end of the aforementioned energy chain 200. If desired, a cover plate 395 (see FIG. 26) can be attached to the bottom of the support body 376 by means of screws 400 inserted through the cover plate and threaded into holes 402. It will be understood that each roller is provided with internal bearings (not shown) of standard construction which allow the roller to rotate freely about its shaft.

Figure 20:
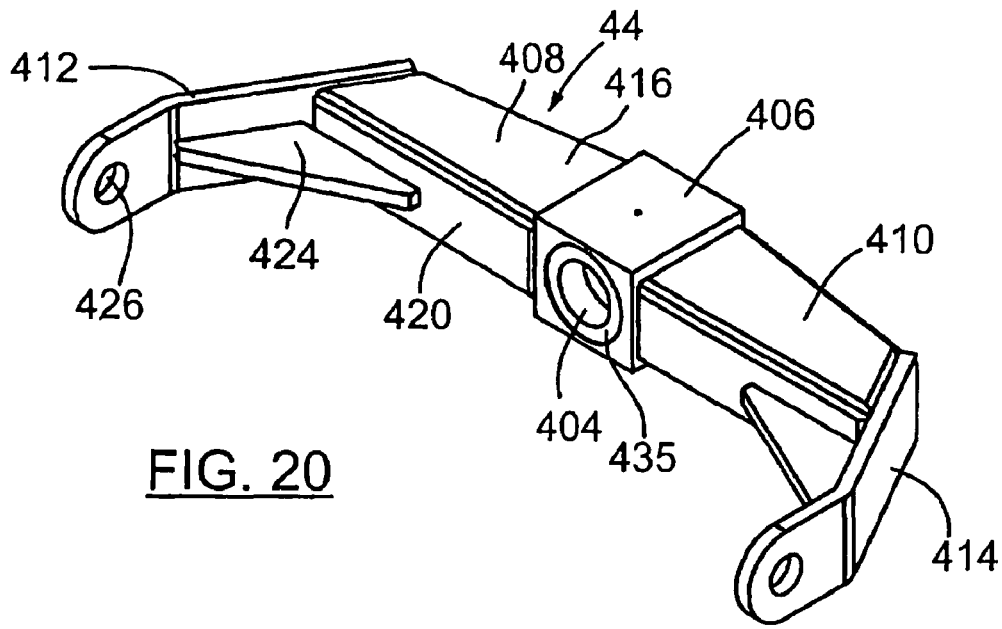
FIG. 20 is perspective view of a pivoting hitch frame which is pivotably connected to the support body of FIG. 17, this hitch frame being shown from above and from an inner side thereof.
Figure 21:
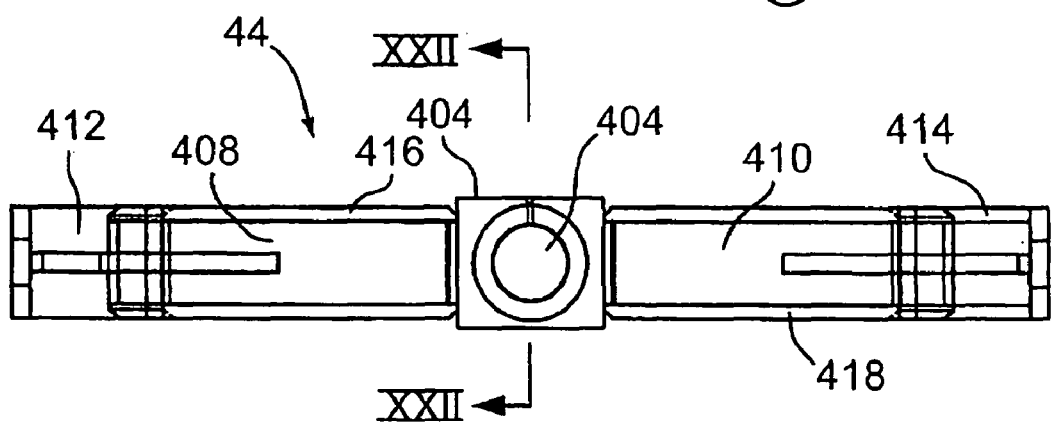
FIG. 21 is an inner side view of the hitch frame of FIG. 20.
Figure 22:
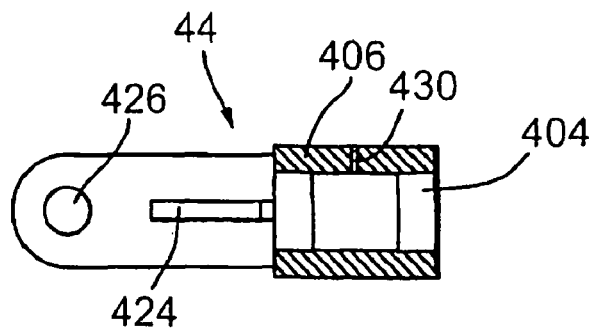
FIG. 22 is a vertical cross-section of the hitch frame taken along the line XXII-XXII of FIG. 21.
Figure 23:
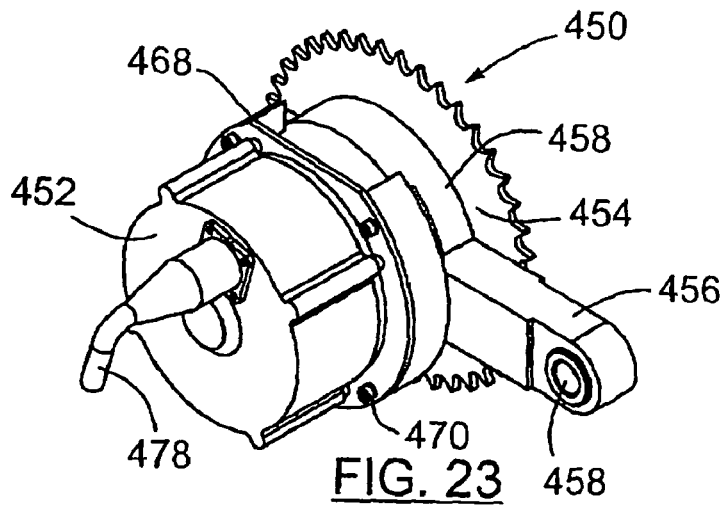
FIG. 23 is a perspective view of an intercar angle sensor assembly mountable on the hitching apparatus.

Turning now to the construction of the pivoting hitch mechanism or hitch frame 44 illustrated separately in FIGS. 20 to 22, this frame is pivotably connected to the support body 376 by means of the pivot pin 56. The pivot pin extends into a pin passageway which is formed in a transverse center of the frame. It will be understood that the passageway 404 which has a circular cross-section extends in a radial direction relative to the radius of the track 46. The hitch frame includes a central block 406 in which the passageway is formed, two tubular arm sections 408, 410 and two end sections 412, 414 located on opposite sides of the pivot pin and spaced therefrom, these end sections being adapted for a pivot connection to an adjacent end section of a second or another mobile machine (similar to or the same as the illustrated machine of FIGS. 1 and 2) during use of the hitch apparatus. Each arm section 408, 410 can be formed from a horizontal top plate 416, a similar, horizontal bottom plate 418, an inner rectangular plate 420 and a rectangular, vertical outer plate 422 (see FIG. 5). These plates can be made of ¾ inch steel plate and can be rigidly connected by welding. Each end section 412, 414 can be formed from a bent steel plate forming an obtuse angle as shown in FIG. 20. The plate used can be one inch steel plate and its connection to its arm section can be strengthened by a triangular brace or gusset 424. A circular hole 426 is formed in the rounded end of each end section to receive a respective one of the car hitch pins 56 shown in FIGS. 1, 2 and 5. Thus, the hitch apparatus of this invention can be pivotably connected to an adjacent second mobile machine by means of these hitch pins which permit relative pivotable movement about a horizontal axis between the two mobile machines or mobile conveyors.

As shown in FIGS. 13 and 22, a grease passageway 430 can be formed in the top of the block 406 and a grease fitting or grease zerk is mounted in the block at the outer end of this passageway. Extending around the pivot pin are fiberglass bushings 432 with one located adjacent the flange 388 and the other located adjacent the outer end of pin passageway 404. Also, a fiberglass thrust bearing 434 can be sandwiched between the inner end of the block 406 in a shallow, circular recess 436 and the flange 388. Hitch mechanism 44 is retained on the central pivot pin 56 by means of a donut-shaped retainer plate 435 which can be ⅞$^{th}$ inch plate having a central hole measuring 1 13/16$^{th}$ inch. Both the plate 436 and the pivot pin are formed with aligned holes to receive a dowel pin 438 which acts to prevent rotation of the plate relative to the pin. The plate 436 is held in place by 3½ inch long screw 440 which extends into a threaded hole formed in the center of the pivot pin. It will thus be seen that the hitch mechanism 44 is free to pivot about the horizontal pivot axis formed by the pivot pin thereby allowing relative movement about this pivot axis between the adjacent connected mobile conveyor vehicles.

For use with an automatic steering system for a train of these mobile conveyor machines of the type described above, it can be desirable for the steering system to know the intercar angle between adjacent cars in the train. Due to the fact that the present mobile conveyor machine has no pivot joint located at the pivot axis between adjacent cars (in other words, there is only a virtual pivot point midway between the two wheels of the machine described herein), a special intercar angle sensor can be provided in conjunction with the pivot mechanism of the present invention so that an electrical signal indicative of the intercar angle can be provided to the steering control for the conveyor train. An exemplary form of such a sensor is illustrated in FIGS. 15, 16 and 23 to 25. This sensor indicated generally by reference 450 is able to determine the angle between the central longitudinal axis of the illustrated mobile conveyor machine 10 and a central longitudinal axis of an adjacent mobile conveyor machine which can be constructed in the same or a similar manner as the illustrated machine. A complete steering system for a train of such vehicles or machines is provided with one of these angle sensors between each pair of adjacent vehicles. Although not shown in FIG. 23, the sensor includes the aforementioned tensioned roller chain 374 mounted on the track 46. It will be appreciated that this chain forms a series of sprocket engaging recesses formed along one side of the track for at least most of the length of the track. These recesses are formed by recess forming members (ie. the pins of the chain). The recesses could also be formed by machining them into the track member itself. The other major component of the sensor is a rotational position transducer 452 which is mounted on the hitch mechanism 44 and, in particular, on the roller support body 376. The sensor has a sensing sprocket 454 which drives a potentiometer to measure the intercar angle. The transducer 452 can, in one embodiment, send electrical signals on a continual or frequent periodic basis to a Siemens programmable logic controller (PLC) used to steer the train of vehicles. This transducer, which can be of standard construction, can have a signal output ranging between 4-20 milliamps with the output depending upon the sensed intercar angle.

Figure 24:
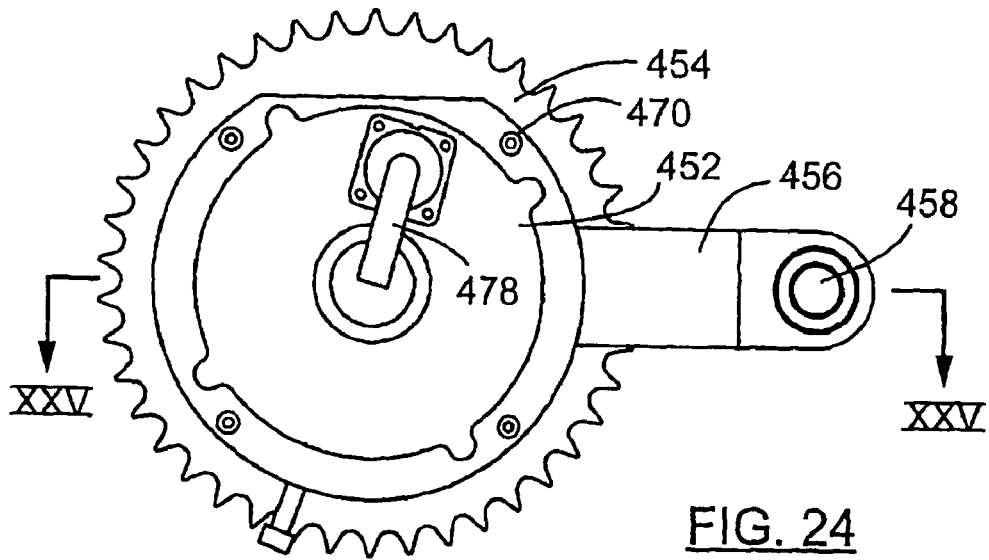
FIG. 24 is a bottom view of the sensor assembly of FIG. 23.
Figure 25:
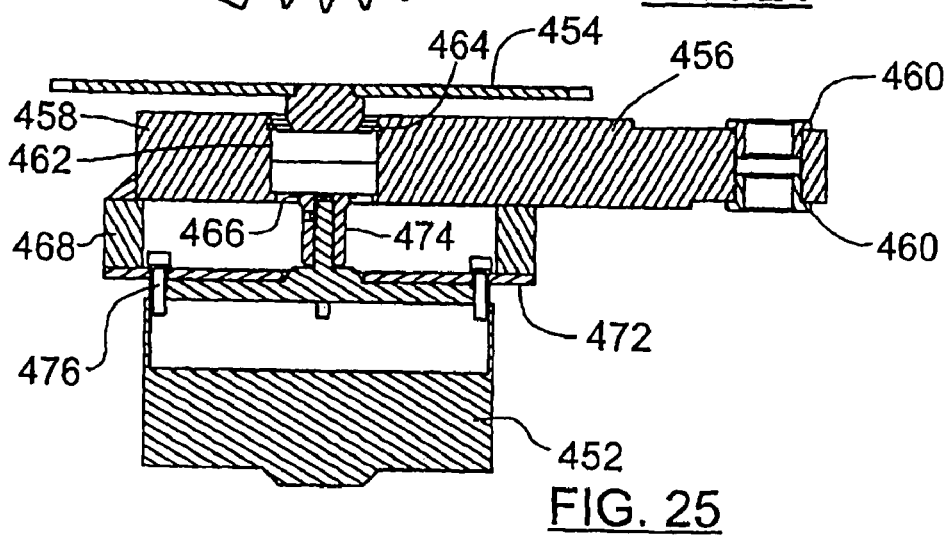
FIG. 25 is an axial cross-section of the sensor assembly taken along the line XXV-XXV of FIG. 24.

With reference to FIGS. 24 and 25, in addition to the transducer, there is shown a mounting arm 456 which includes an annular end section 458 on which the transducer can be mounted. The arm 456 is attached by a pivot pin 457 to the bottom edge of the side plate 392, this pivot pin extending through hole 458. There can be mounted in this hole two Oilite friction bearings 460, one at each end. Rotatably mounting the shaft for the sprocket 454 are two deep groove ball bearings 462 arranged next to one another. The bearings can be held in an opening by means of a retaining ring 464. On the transducer side of the bearings there can be a further external retaining ring 466. Welded to the arm on the side opposite the sprocket is a transducer mount 468 which extends through an arc of more than 270°. Attached to this mount by four screws 470 is a transducer mounting plate 472. The central shaft of the transducer extends through this plate and is received within a central passageway formed in sprocket shaft 474 and is secured thereto (for example by a set screw) for rotation therewith. The transducer is detachably mounted to the plate 472 by four screws 476. The end of an electrical control cable operatively connected to the transducer is indicated at 478.

It will be seen from the above description that the transducer and its mounting are pivotably mounted to the plate 392 of the hitch mechanism. An elongate coil spring 480 (see FIG. 15) is then provided to bias the sensor and in particular its sprocket 454 into engagement with the roller chain 374. The reason for this spring mounting is to provide some flexibility to the sensor mount, thereby reducing the possibility of damage, for example, if something such as dirt or a stone should become lodged in the sprocket or the roller chain. It should also be noted that the roller chain is kept under tension itself by means of an adjustable tension rod 482 at one or both ends of the chain.

Figure 27:
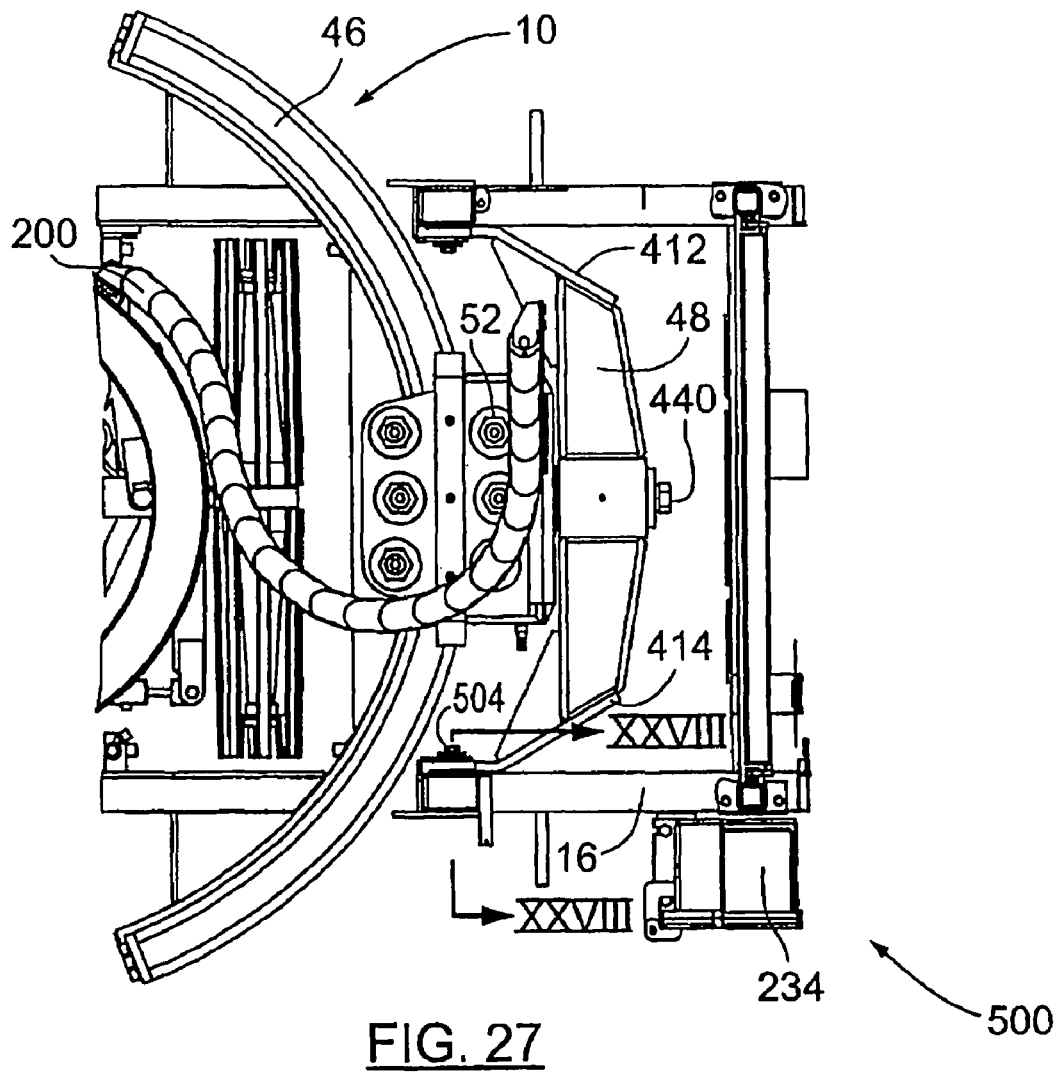
FIG. 27 is a detail plan view of the hitching apparatus mounted on one end of a mobile conveyor machine and showing an adjacent end section of an adjacent conveyor machine connected thereto.
Figure 28:
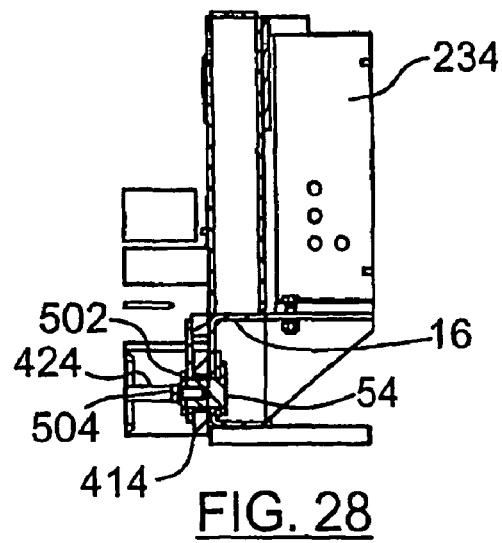
FIG. 28 is a vertical cross-section taken along the line XXVIII-XXVIII of FIG. 27 showing one of the two pivot pin connections joining the two conveyor machines.

FIGS. 27 and 28 illustrate an actual connection between the inby end of one mobile conveyor machine constructed according to the invention with the outby end of another mobile machine 500, only an end section of which is shown. Two car hitch pins 54 are used to attach the rolling hitch device 48 to the two ends of the frame 16. Each hitch pin can be held in place by a washer plate 502 and a screw 504 that extends through the plate 502 and into a threaded hole in the end of the hitch pin.

Figure 26:
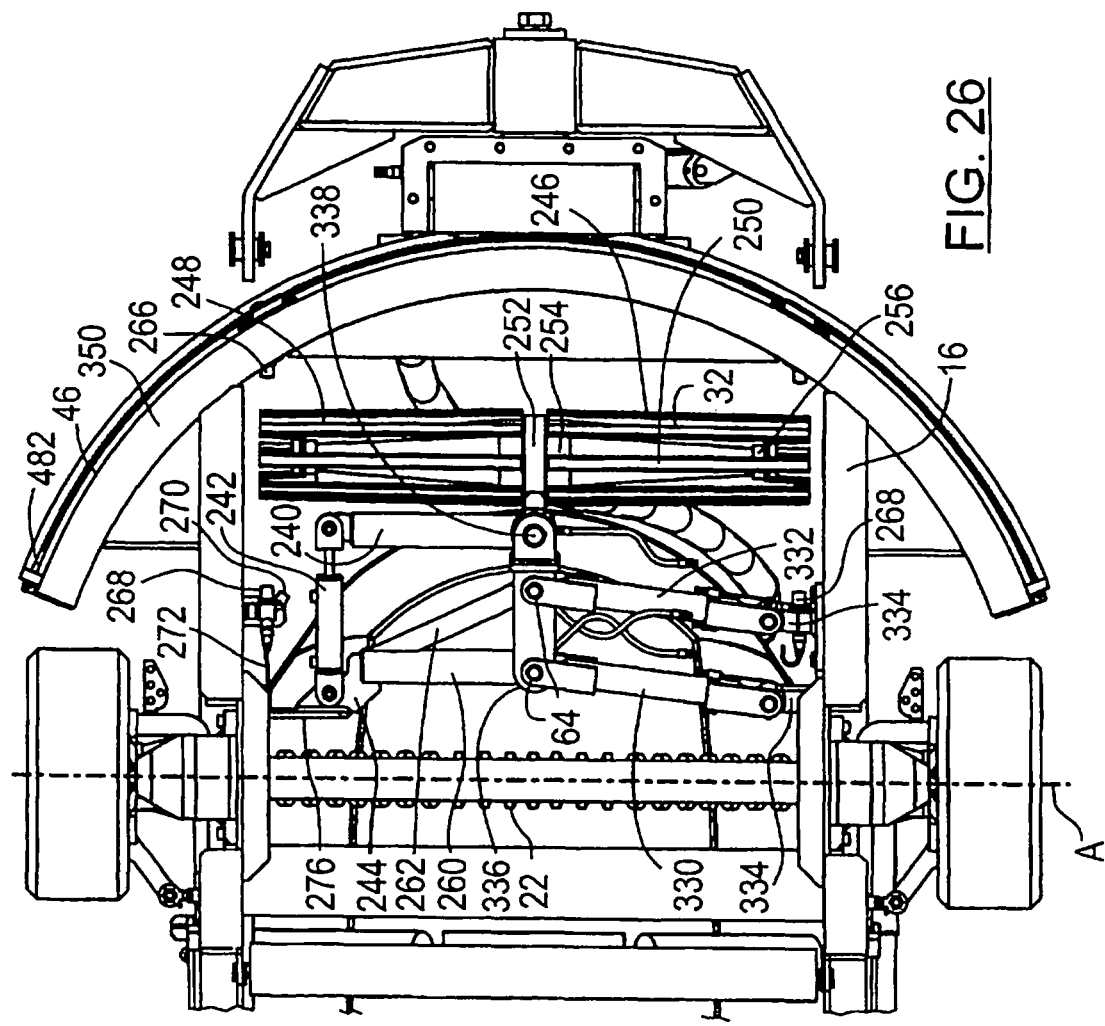
FIG. 26 is a partial bottom view of the conveyor machine showing the end where the tail pulley is mounted and the hitching apparatus.

Turning now to the mounting mechanism for the tail pulley 32, this mounting system as seen most clearly in FIG. 26 includes two parallel links or swing arms 330 and 332 which are pivotably mounted on pivot pin sleeves 334 fixedly mounted on the inside of the frame 16. The inner ends of the links are located along the longitudinal centreline of the car and are pivotably connected to central mounting frame 336 which provides support for a substantially vertically extending pivot pin 338. Pivotably connected to this pin is a belt control arm 240 which in turn is pivotably connected to the actuator rod of a belt training hydraulic cylinder 242. The closed end of this cylinder is pivotably connected to an adjustable horizontal support plate 244.

The tail pulley itself comprises two rotatable pulley sections 246 and 248 which rotate about a non-rotating central support shaft (not shown) located along the centerline of the pulley indicated at 250. The shaft extends from opposite sides of a central, circular support block 252 rigidly connected to one end of the control arm 240. Mounted on opposite sides of the support block are two central bearings located at 254, each rotatably supporting a respective one of the pulley sections 246, 248. In a known manner, the exterior of these pulley sections comprises a series of parallel, spaced-apart metal slats, the inner ends of which are mounted on an outer annular support member which contains the central bearing. An outer bearing located at 256 is mounted on the outer end of each section of the shaft 50 to support the outer end of the respective pulley section. Horizontally extending frame members 260, 262 are fixedly connected to the central frame 336 and are also connected to the plate 244. These frame members are used to apply force to the tail pulley in order to tension same.

The position of the tail pulley can be adjusted for belt training purposes using the hydraulic cylinder 242. In order to provide an automatic system for correcting the position of the conveyor belt, a photosensor system can be provided at each end of the tail pulley. As illustrated, there are two photoemitters 266 mounted on the curved track 46. For each of these photoemitters there is a photoreceiver 268 which can be seen in FIG. 26. As long as the conveyor belt is properly centered on the tail pulley, pulses of a light beam can travel from each photoemitter 266 (through the gaps in the adjacent pulley section) to its respective photoreceiver which is mounted on the inside of one of the longitudinal frame members forming the frame 16. However, if the belt moves transversely on the tail pulley so as to block entirely one of the light beams, this provides a signal to a programmable logic controller which causes retraction or extension of the actuator rod of the hydraulic cylinder 242. The actuator rod will move in a direction so as to cause the central shaft of the tail pulley to be pivoted in a horizontal plane so as to tighten the belt on the side to which the belt has moved. This will tend to cause the belt to move back towards its center position.

As illustrated, each photosensor is aligned with the end section of the tail pulley so that the light beam is regularly broken by the parallel slats on the exterior of the tail pulley. Because of this arrangement, each photoreceiver sends a pulse signal to the programmable logic controller when the belt is not entirely blocking the light beam. Thus, if the belt is properly centered, pulse signals are being sent to the controller by both photoreceivers 268. When a pulse signal is not being emitted by one of the light receivers, then this indicates that the belt has moved too much in the direction of this particular receiver and the control system will take steps to re-center the belt.

Extending from a small winch 270 is a two inch wide nylon strap 272. The winch and strap are positioned above one photoreceiver 268 and are mounted on the inside of the main frame 16 of the vehicle. The strap extends to a metal hook which extends through a hole formed in the end of a vertical connecting plate 276. The plate 276 is rigidly connected to one edge of the horizontal plate 244. It will be appreciated that once the conveyor belt is mounted in place and extends around the tail pulley (as well as the head pulley) the conveyor belt can be tensioned properly by pulling on the strap 272 which in turn will cause the frame members 260, 262 and the attached central frame 336 to move in a direction towards the tail pulley end of the vehicle.

Figure 32:
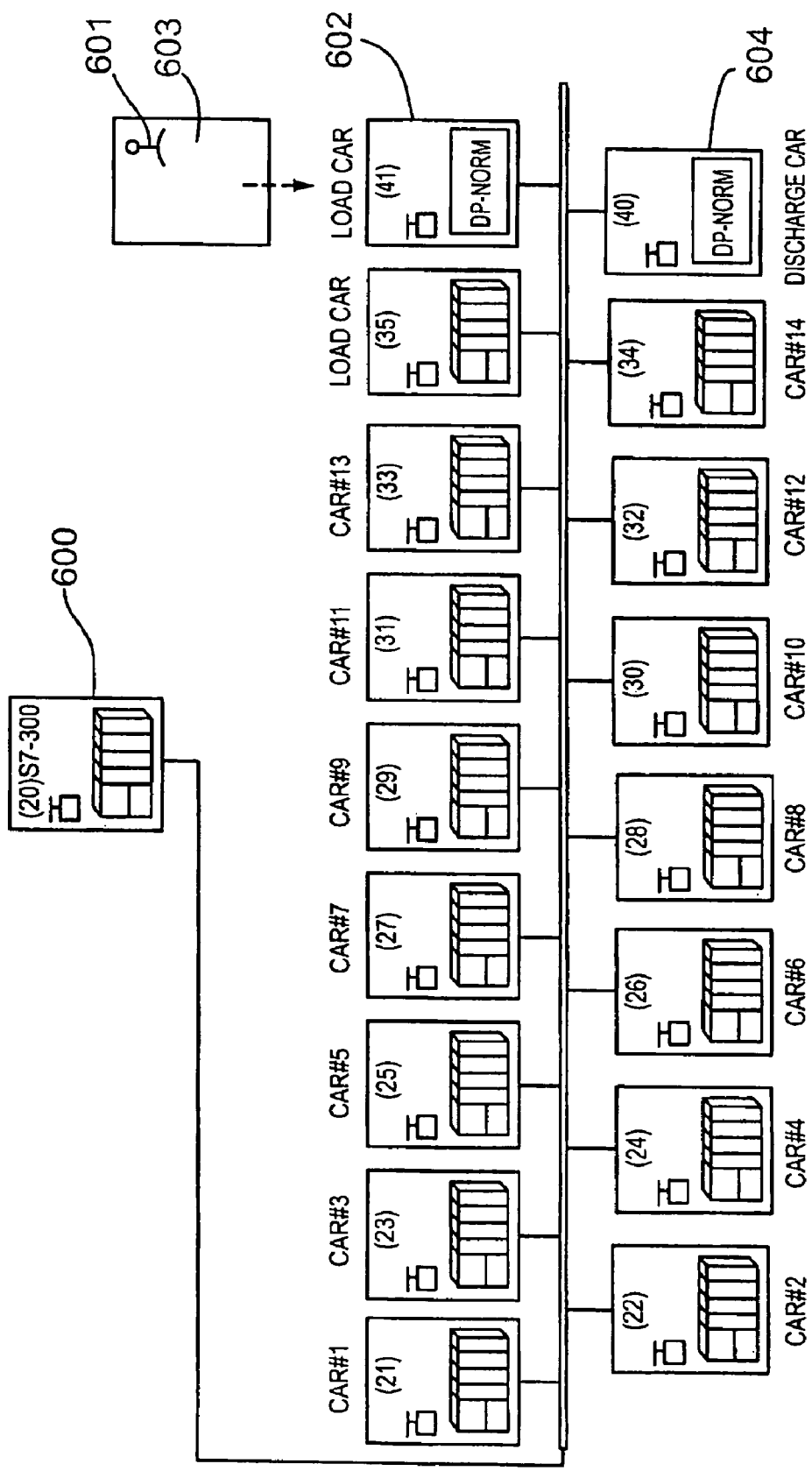
FIG. 32 is a schematic illustration of a network of programmable logic controllers (PLCs) for a train of conveyor vehicles.

FIG. 32 illustrates an exemplary network of programmable logic controllers for a train of mobile conveyor vehicles as described above. This control system operates by means of a master PLC indicated at 600 which can be located on the discharge car which, as indicated, is preferably equipped with two PLCs, one for each of its two pairs of wheels since the PLCs can also be used for steering purposes. There are fifteen intelligent slave PLCs in this particular system which can be numbered from one to fifteen and which, as shown in the drawings, have Profibus addresses numbered from 21 to 35. In a preferred embodiment, the PLCs are operated by wireless radio commands using two receiving radios, one receiving radio located on the discharge car and the second receiving radio located at the load car. The load car receiving radio is indicated at 602 while the discharge car receiving radio is indicated at 604. In this way, a train of conveyor vehicles can be operated from either end of the train by a radio transmitter unit 603, which preferably is a portable unit carried by the operator. All commands come from the master PLC and go to the others by the Profibus system. The same computer code can be used in each of the slave PLCs so that the conveyor cars are interchangeable for any particular job. It will be understood that the load car radio will be used by the load car operator to operate the conveyor system when a mining operation is underway. The discharge car radio can be used by the discharge car operator who may also be operating the cross-conveyor on the discharge car. The radio control system is interlocked so as to prevent conflicting signals, with the switch to determine which radio is operable being located on the load car radio. As illustrated in FIG. 32, the discharge receiving radio can be assigned Profibus address 40 while the load car receiving radio can be assigned Profibus address 41. A manually operated joystick control 601 can be provided on the transmitter unit 603. This joystick control is used to steer the leading pair of wheels on the train through the PLC on the leading vehicle. The joystick control is of standard construction and accordingly a detailed description herein is deemed unnecessary.

Figure 33:
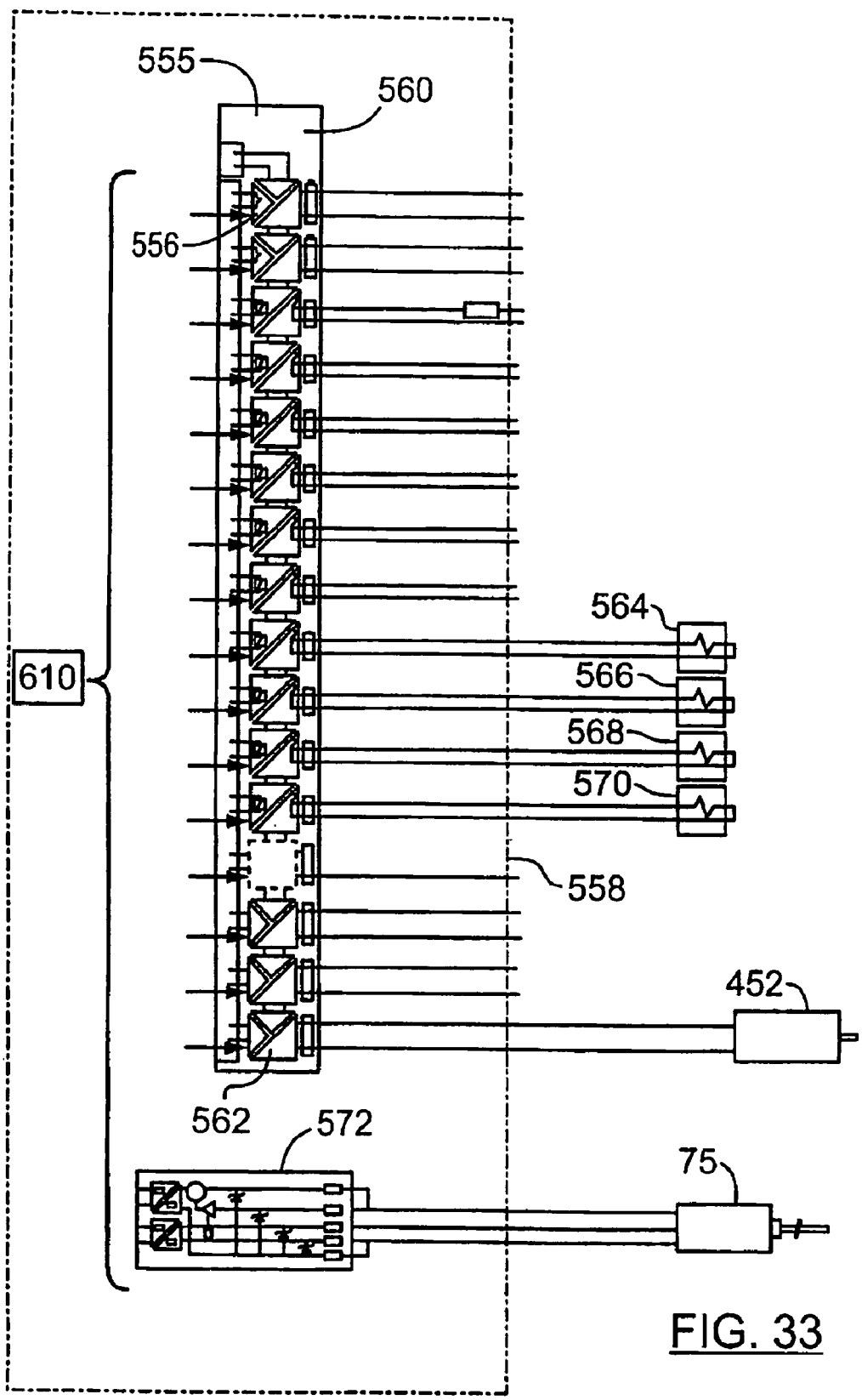
FIG. 33 is an electrical circuit diagram illustrating the circuits connected to each PLC to steer each conveyor vehicle and to cause this vehicle to turn in a desired direction.

FIG. 33 illustrates those portions of the electrical circuit provided on each conveyor vehicle in order to steer the vehicle and to cause the vehicle to tram in a desired direction. This electrical circuit is connected to the programmable logic controller (PLC) for the respective vehicle. For safety in a mine environment, the circuit includes an intrinsically safe barrier 555. Intrinsically safe barriers will prevent a strong enough spark or thermal effect that could cause ignition of combustible material in the air. This barrier is connected to the input of the PLC for the vehicle at 556. The PLC which could be a slave PLC indicated at 610 together with the barrier 555 are housed in a flame proof enclosure indicated partially by the chain link line 558. The barrier includes a barrier rack in which a plurality of intrinsically safe barrier components 562 are plugged, these barrier components being well known in the mining equipment art for the purpose of preventing short circuiting. Also shown in FIG. 33 are a first solenoid valve 164 for steering the wheels of the vehicle to the right and second solenoid valve 566 for steering the wheels to the left. These valves can be of identical construction. These valves control the flow of hydraulic fluid into or out of the hydraulic cylinders 74 of the linear actuators that pivot the wheels of the vehicle about their respective vertical axes. There are also connected by safe barrier components two further solenoid valves 568, 570. Again, these two valves can be of identical construction and suitable valves are available from Bosch Rexroth of Germany. These valves can also be of the same type as the valves 564, 566 used for steering. The valve 568 is used to direct hydraulic fluid to the two hydraulic motors for the two wheels 64, 66 in order to tram or drive the vehicle in the outby direction. Similarly the solenoid valve 570 is used to direct hydraulic fluid to the same two motors to tram or drive the vehicle in the inby direction. Also connected to one of the barrier components 562 is the rotational transducer which is used to measure the intercar angle for the vehicle. In one exemplary embodiment, this transducer is one sold by Celesco. The aforementioned steering angle sensor 75 is electrically connected to its own safe barrier 572. In one exemplary embodiment, each barrier component 562 is a Phoenix contact and the safety barrier 572 is one sold by Pepperl and Fuchs.

Figure 34A:
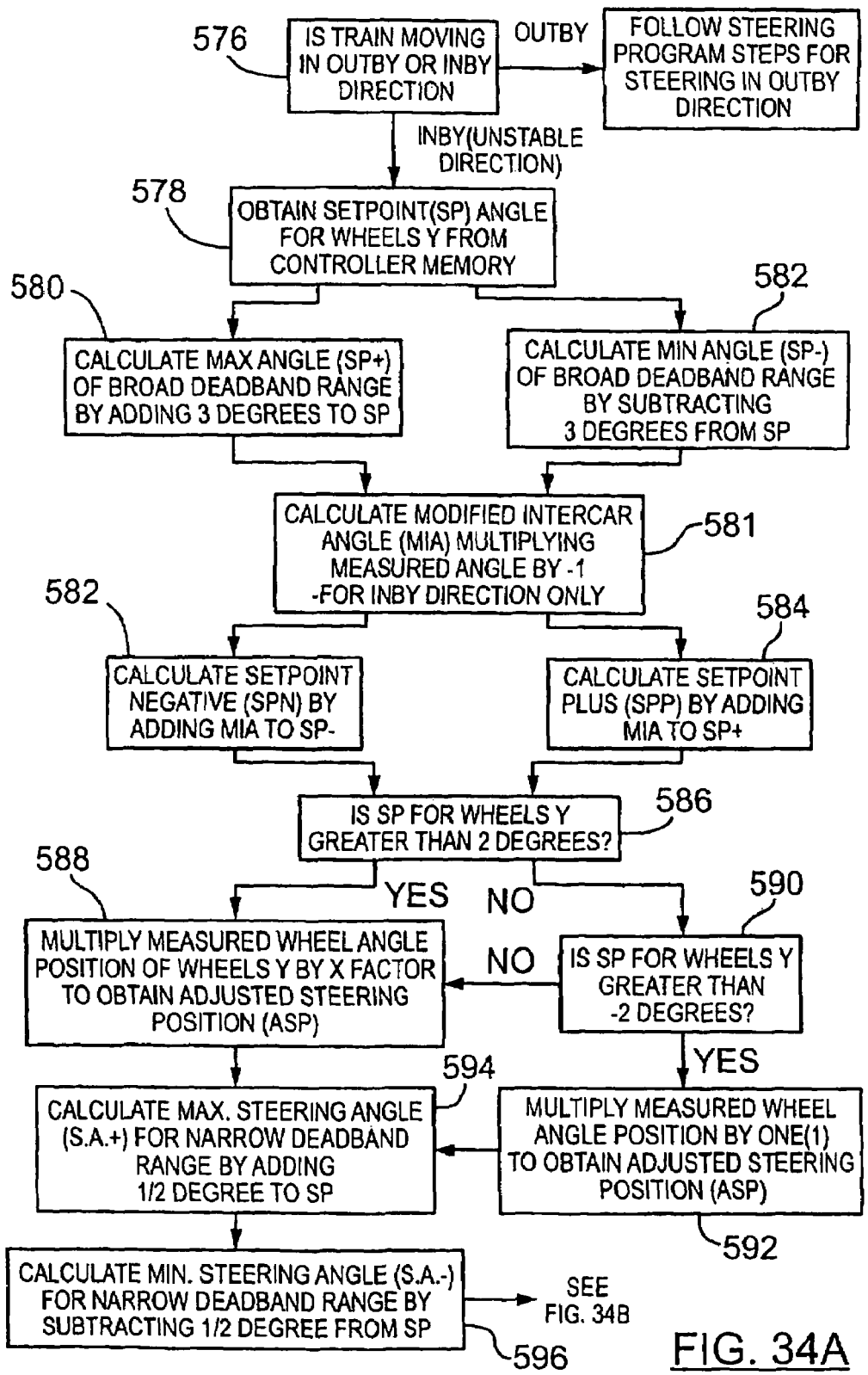
FIGS. 34A and 34B are two parts of a flow chart illustrating the steering logic used for steering each pair of wheels trailing a leading pair of wheels.
Figure 34B:
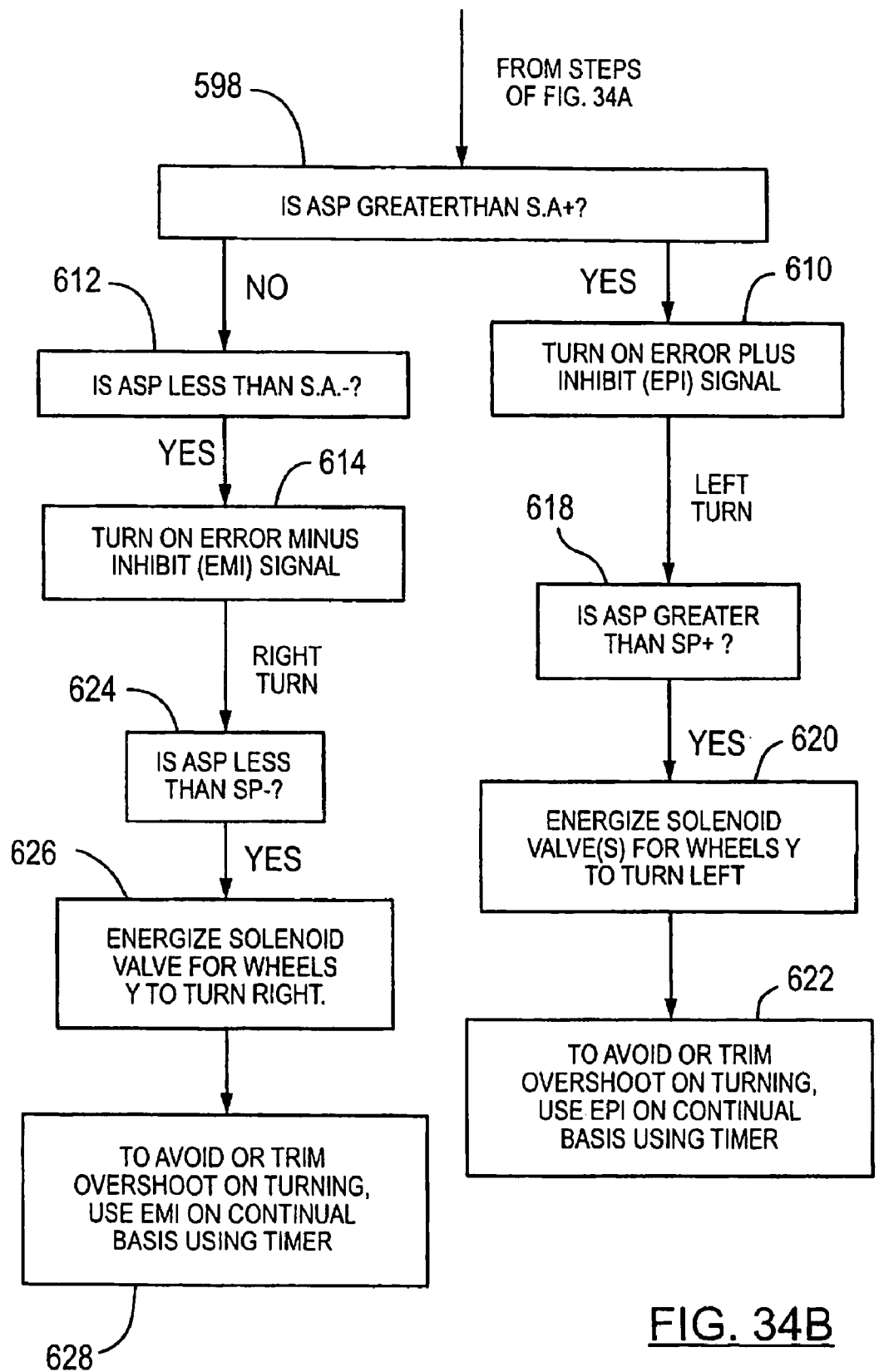

Turning now to the software flow chart of FIGS. 34A and 34B, it should be recognized that this software program is carried out by a plurality of PLCs, one for each pair of wheels in a train of conveyor vehicles. As explained below, these include a master PLC 600 and a number of intelligent slave PLCs, with all of the PLCs being linked and coordinating their steering operation as the train moves in either the reverse or forward direction. All commands come from the master PLC 600. It will be understood that the terms "controller", "controller system", and "control means" as used herein can include a plurality of PLCs working as one overall steering control system. It will be further understood that the leading pair of wheels in the train as determined by the direction of movement of the train is steered manually that is by human operator at the leading end of the train using a separate steering control for this specific purpose, for example the joystick control 601. The objective of the automatic steering system described hereinafter is to have each pair of trailing wheels follow the same path of movement as the leading pair of wheels.

Once the train of conveyor vehicles has commenced movement at a fixed, predetermined rate of travel, for example by pushing an appropriate tramming ON button and provided the steering system is set to automatic steering, the master PLC first determines the direction of travel of the train at step 576, that is, is the train moving in the outby direction or in the inby direction. The sequence of subsequent software steps taken will depend to a certain extent on this direction of travel and the steps illustrated in FIGS. 34A and 34B assume an inby direction of travel. The computer program for steering is quite similar for an outby direction of travel with any significant difference being noted in the following description of the program for steering in the inby direction. The illustrated series of program steps apply generally to each pair of trailing wheels in the train of vehicles with a sample pair of wheels being identified by the letter Y in FIG. 34A. For each set of trailing wheels, the Profibus system on an ongoing and continual basis (or frequent periodic basis) provides a setpoint angle for the wheels Y. This setpoint (SP) angle is taken from the memory of the master PLC and it is the desired steering angle for the wheels Y, this angle being the angle that the leading pair of wheels had when the leading wheels were in the same location as the current location of the wheels Y. After obtaining the setpoint angle in step 578, the master PLC then calculates a broad deadband range by calculating a maximum angle (SP+) of this range and a minimum angle (SP−) for the range. In one exemplary embodiment, the broad deadband range R is 6 degrees but this range can vary to some extent depending upon the particular steering system and its characteristics. Accordingly, SP+=SP+3 degrees, while SP−=SP −3 degrees. These two calculations are indicated by steps 580, 582.

The next program step indicated at 581 is to calculate a modified intercar angle (MIA) by multiplying the measured intercar angle at the wheels Y by −1. This program step is only required for movement in the inby direction and is not required for movement in the outby direction, which is a more stable direction of movement of this steering system. The next two steps represented by 582 and 584 represent two calculations required to determine the desired steering angle range for the wheels Y. This calculates a setpoint negative (SPN) by adding the modified intercar angle (MIA) to SP−. Also the program calculates setpoint plus (SPP) by adding the modified intercar angle (or if moving in the outby direction, simply the intercar angle) to SP+. In step 586, the program determines if the setpoint (SP) for the wheels Y is greater than a predetermined small angle which in one exemplary version of this system is 2 degrees. As indicated in step 588, if the setpoint for wheels Y is greater than 2 degrees, then the program will multiply the measured wheel angle position, that is the actual existing position of the wheels Y, by a predetermined factor X to obtain an adjusted steering position (ASP). The reason for this is to adjust for drift in the position of the wheels Y as the train of vehicles is moving in the inby direction. The amount of this drift will vary because it depends on such factors as the length of the conveyor train and other factors. The amount of the factor X for each conveyor system can be calculated by means of trial runs of the particular conveyor system when it has been built. In one exemplary embodiment for such a system, the factor X is 0.5. Note also that the factor X can change or be different for each pair of wheels in the train of conveyor vehicles. If it is determined that the SP for wheels Y is not greater than 2 degrees (for example), the program in step 590 then asks if the setpoint for the wheels is greater than −2. If the answer is no, then the program proceeds to step 588 to multiply the measured wheel angle position by factor X. However, if the answer is yes, then step 592 applies and the measured wheel angle position is multiplied by one to obtain the adjusted steering position (ASP). In other words, there will be no adjustment to the setpoint if the desired steering angle is less than a small predetermined angle (either positive or negative) since under these circumstances drift of the wheels is not a significant problem. With respect to these drift adjustment steps, if the train is moving in the outby direction, the factor X is different for the outby direction of movement than it is for the inby direction. Again, the amount is determined by testing and steering a particular train of vehicles. In one version of a vehicle train, the factor X for movement in the outby direction was 1.2.

In the next step 594, a narrow deadband range is determined, firstly by calculating a maximum steering angle (SA+) by adding one-half of the narrow deadband range to the setpoint (SP). In one steering system, the narrow deadband range was set at 1 degree so that one half of the narrow deadband range was ½ degree. In a similar manner, in step 596 the program calculates the minimum steering angle (SA−) for this narrow deadband range by subtracting ½ degree from the setpoint SP.

Turning now to the additional program steps illustrated in FIG. 34B, in step 598 the program determines if the adjusted steering position (ASP) is greater than the maximum steering angle (SA+). If the answer is yes, the program turns on an error plus inhibit (EPI) signal in the PLC (step 610). If the answer is no, the program in step 612 then determines if the ASP is less than SA−. If the answer is yes, the program turns on an error minus inhibit (EMI) signal in step 614. Although not indicated in the flow chart, it will be understood that if ASP should be less than SA+ and more than SA−, then neither the EPI signal nor the EMI signal is turned on for the remaining calculations.

The distance traveled by the train is determined by the number of pulses generated by the controller, this number being dependent directly on the amount of time the train has been tramming from a selected location, for example the point at which the train was last stopped. With the illustrated train of conveyor vehicles, the steering program is set up so that the first pair of trailing wheels is adjusted to a desired steering angle which is based on the steering angle of the leading pair of wheels with a delay factor of one half car or vehicle length in time. In other words, the desired steering angle for the first pair of trailing wheels is calculated on the basis of the actual steering angle of the leading set of wheels which existed before the train moved one-half car length to its current position. In the case of the remaining trailing wheels, there is a full car length delay in the application of the steering angle of the leading pair of wheels between a respective pair of trailing wheels and the pair of wheels immediately in front of this pair. In program step 618, the program determines if the adjusted steering position for the wheels is greater than the maximum angle (SP+) of the deadband range. If the answer is yes, then the solenoid valve 566 is energized to turn the wheels Y to the left as indicated in step 620. Overshoot is avoided or trimmed by the use of the error plus inhibit (EPI) signal which together with an error timer reads the actual angle of the wheels every 250 milliseconds. If the measured actual wheel angle is in the narrow deadband range, then the solenoid valve 566 is turned off, preventing further turning movement to the left.

The additional steps 624, 626 and 628 are the program steps for turning the wheels Y to the right when moving in the inby direction. The program determines if the adjusted steering position (ASP) is less than the minimum angle (SP−) of the deadband range. If it is, then turning of the wheels to the right is required and in step 626, the solenoid valve 564 for the wheels is energized to cause the hydraulic cylinders for the wheels Y to turn the wheels right. Again overshoot is prevented by using the aforementioned error minus inhibit signal (EMI) on a continual or frequent basis during the turning movement using an error timer. The actual angle of the wheels can be measured every 250 milliseconds and once the actual measured angle is within the narrow deadband range, the solenoid is de-energized.

Figure 35A:
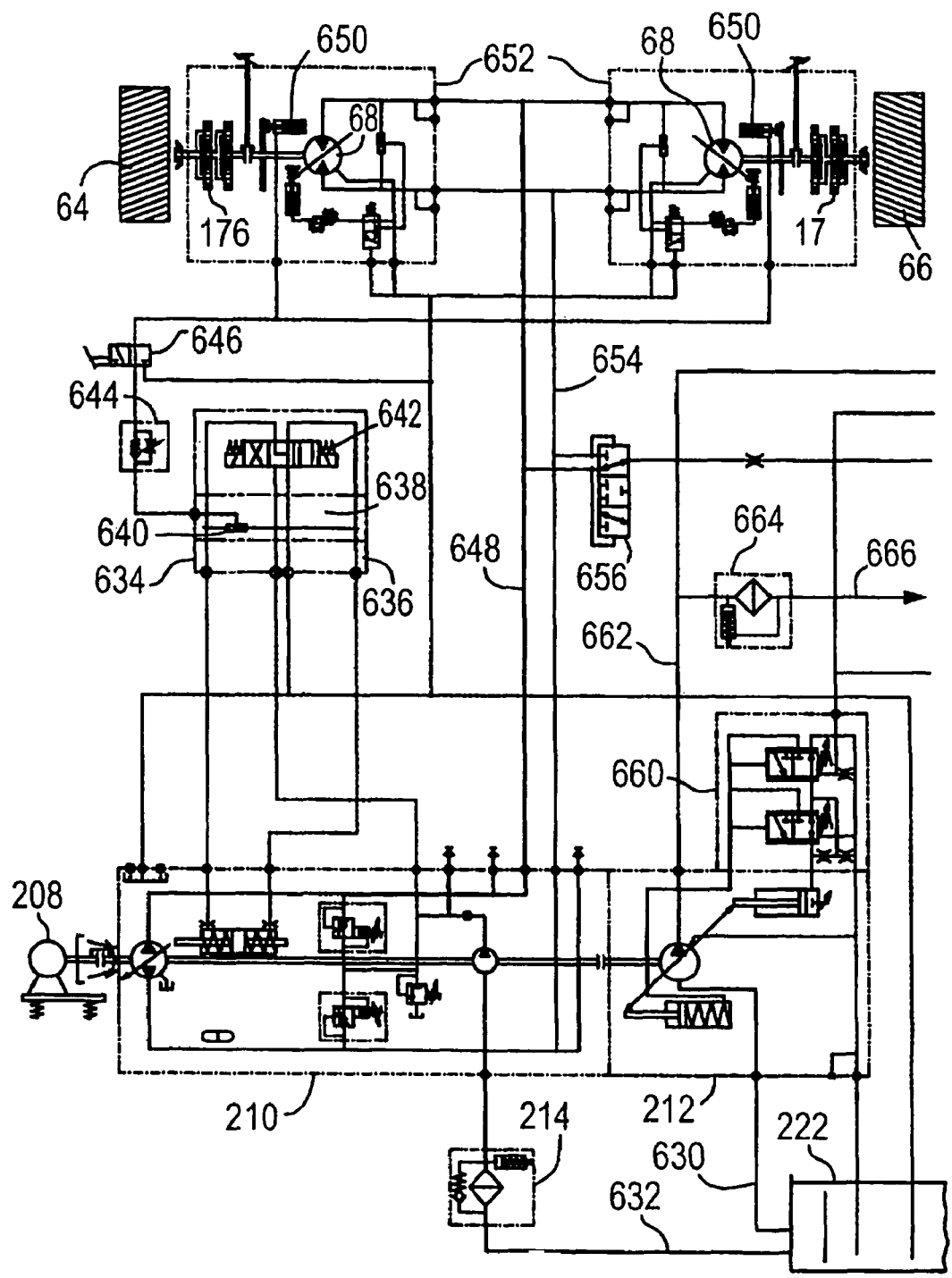
FIGS. 35A and 35B are left and right portions of a hydraulic schematic illustrating the hydraulic systems used to drive and to steer each conveyor vehicle.
Figure 35B:
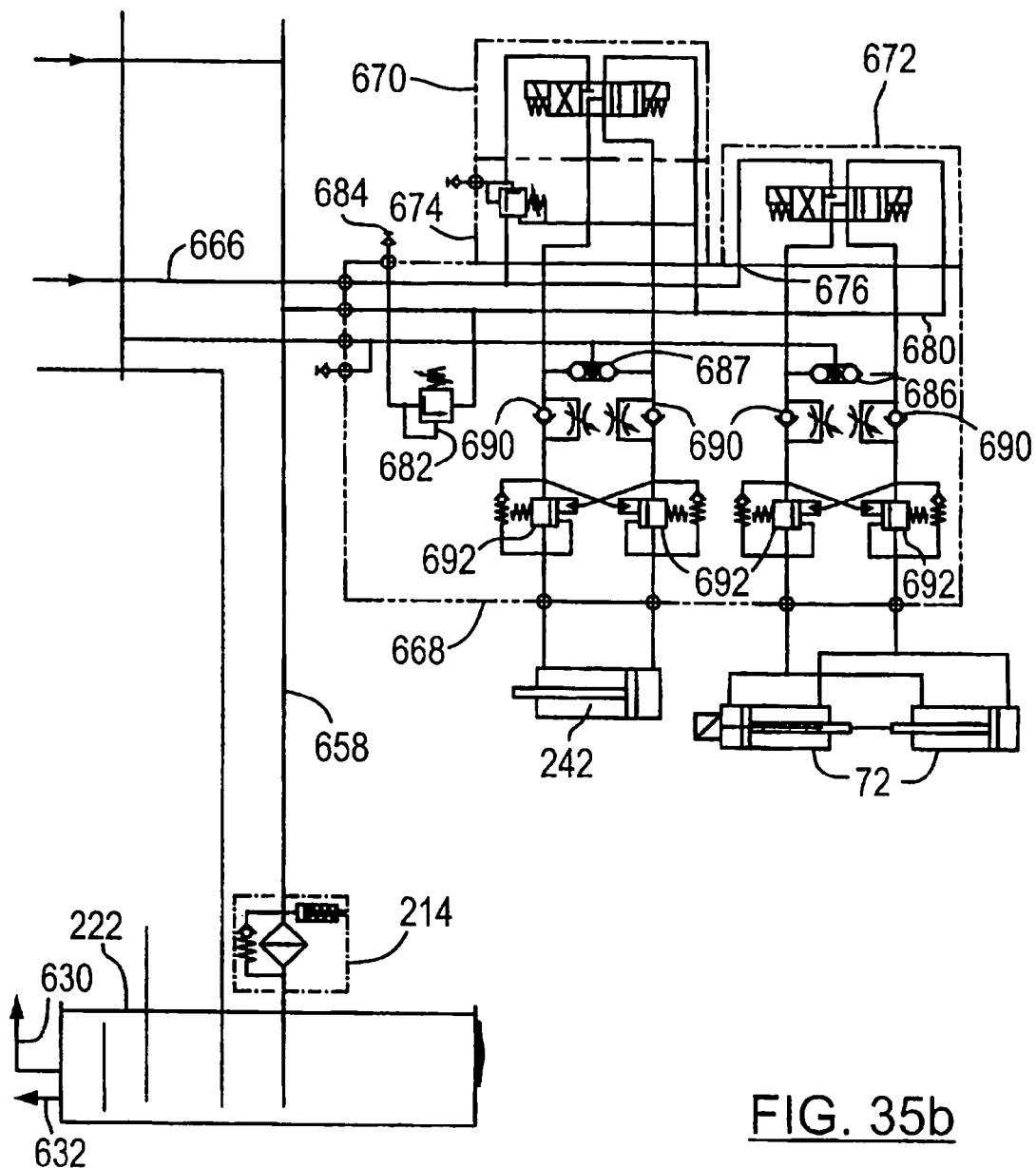

Turning now to the hydraulic system used to tram the conveyor train and to provide hydraulic power to steer the wheels, FIGS. 35A and 35B are left and right portions of a hydraulic schematic illustrating the hydraulic systems on one of the conveyor vehicles. It will be understood that the intake or loading conveyor vehicle and the intermediate conveyor vehicles have identical hydraulic systems, an exemplary version of which is shown in FIGS. 35A and 35B. Also, the discharge car includes similar hydraulic systems as those shown in these figures but it includes as well an additional conveyor lift and swing hydraulic system, which is not illustrated as it does not form part of the present invention and is a standard hydraulic system construction.

Turning first to the hydraulic system components illustrated in FIG. 35A, indicated in the bottom right corner is the hydraulic fluid reservoir 222 which can have a capacity of 60 liters of hydraulic oil. The reservoir has 2 outgoing hydraulic lines 630, 632. The line 630 leads to the auxiliary hydraulic pump 212, which is used to provide hydraulic fluid to the auxiliaries of the vehicle, including the steering cylinders. A suitable pump for this purpose is that built by Bosch Rexroth (hereinafter referred to as "Rexroth), model number A10VS010DFR-52R-PUC64N00.

As explained above, this hydraulic pump is driven by the electric motor 208 as is another hydraulic pump 210. The motor can be an explosion proof 10 horsepower motor operating at 1,470 rpm rotating in the clockwise direction. The pump 210 which is used to provide hydraulic fluid to the hydraulic motors for the two wheels of the vehicle in one embodiment is a pump sold by Rexroth under model number AA10VG18DGM1/1DR-NSC66F0145. Connected to pump unit 210 and controlling its operation is a manifold assembly 634 which has 3 parts including sub-plate 636, sandwich plate 638 having shuttle cartridge at 640, and solenoid valve 642. The solenoid valve is an electrically operated open-close valve which is operated by the PLC of the vehicle. In one version of the vehicle, the manifold assembly is one made by Rexroth, model number G341/12-A1-PM-114. Hydraulically connected to the shuttle cartridge 640 is a flow control delay brake 644 which can be a flow control made by Hydac, model number DRV-8-1.1/12. Connected to this delay brake is a brake check valve 646 which can be a ball valve made by DMIC, model number BV3D-0250SA-111.

The outlet port of pump unit 210 is connected by hydraulic line 648 to the two hydraulic motors 68, which drive the 2 wheels 64, 66. As indicated above, each hydraulic motor is operably connected to a planetary gearbox 176, which is connected to the respective wheel in order to drive same. In an exemplary embodiment of this drive system, the gearbox 176 is a two-stage planetary gearbox with a reduction ratio of 43:1. A parking brake 650 can be provided for each wheel. The wheel drive unit for each wheel outlined by chain link line 652 can be a wheel drive sold by Rexroth, model number GFT7T2.4042. A second hydraulic line 654 also extends from a port of hydraulic pump unit 210 to the two hydraulic motors 68. Thus hydraulic fluid can flow in either direction through lines 648 and 654, the direction depending on the direction of travel of the vehicle required. In one embodiment, the flow rate through these lines is 7 gallons per minute. Connected to the line 654 is a hot oil shuttle 656 which can be a unit sold under the name Command, model number HOSV-10-N-C-6TS. The line 648 is also operatively connected to the shuttle 656. The shuttle is used to direct returning hydraulic oil to the reservoir 222 through hydraulic return line 658 shown in FIG. 35B. Line 658 is connected to the reservoir via return filter 214. This filter can be one sold under the name Western Filter, model number E0211B2R10. There is another filter 214, which can be referred to as a suction filter, connected in the hydraulic line 632 between the reservoir and pump unit 210.

The auxiliary pump unit 212 is operated by and controlled by the valve unit at 660, which in turn is controlled by the vehicle's PLC. The outlet port of the pump unit 212 is connected to hydraulic line 662, which branches into two lines, one of which extends through filter 664, which can be a 10 um filter made by Hydac, model number DFBH/HC30G10B1.1/12. This filter is connected via hydraulic line 666 to a manifold assembly 668. In one exemplary embodiment, this manifold assembly unit is made by Rexroth, model number VB8.037.A2. Connected to this manifold assembly are two similar solenoid valves 670 and 672, which are controlled by the programmable logic controller of the vehicle. These solenoid valves can be valves sold by Rexroth, model number 4WE6J5X/BG12-19NXHCKL. The solenoid valve 670 is used to control the belt training hydraulic linear actuator 242, the operation of which has been described above. The solenoid valve 670 is mounted on a reducing valve 674 which can be one made by Rexroth, model number ZDR6DP2-4X/75YM/12. The line 666 is connected by a passageway in the manifold assembly to the inlet port 676 of solenoid valve 672. The outlet port of the manifold valve is connected by another passageway 680 in the manifold to hydraulic return line 658. Depending on the desired direction for turning the two wheels of the vehicle, the solenoid valve 672 can direct hydraulic fluid to either end of the two hydraulic linear actuators, which are used to steer the two wheels of the vehicle. Hydraulic oil in the cylinder is allowed to flow out of the cylinder from the end opposite the end of the cylinder into which the hydraulic fluid is being fed by solenoid valve 672.

Turning to the components which make up the manifold assembly 668 which has a load sensing capability, these include relief valve 682, which can be a valve sold under the name Command, model number RVDA-08-N-S-0-30/28. This relief valve is connected to line 680 and to the test point at 684. Also mounted in the manifold are two shuttle cartridges 686, 687, which can be of the same construction. These cartridges provide hydraulic feedback for the associated hydraulic cylinder to the auxiliary pump and they are part of the load sensing system. They ensure that the pump provides enough hydraulic pressure to enable the cylinder to operate as intended. In one embodiment, these cartridges are sold by Sun, model CDAB-XBN. Mounted in each of the hydraulic lines extending from the solenoid valves 670, 672 are flow control units 690, which can be of similar construction, for example the unit sold by Command, model number FCVL-08-N-S-0-FF. The units 690 are used to set the speed at which the hydraulic cylinders move in order to get the correct response in the hydraulic system. Also mounted in each hydraulic line extending from solenoid valve 670, 672 are cartridges 692, which are counter balance valves that are factory set at 3,000 PSI. A cartridge that can be used for this purpose is Command cartridge, model number CBPA-08-N-S-0-30 CB. Each cartridge 692 functions like a pilot operated relief valve so that when the maximum set pressure (which is adjustable) is achieved, the cartridge will dump the oil for safety reasons.

Figure 30:
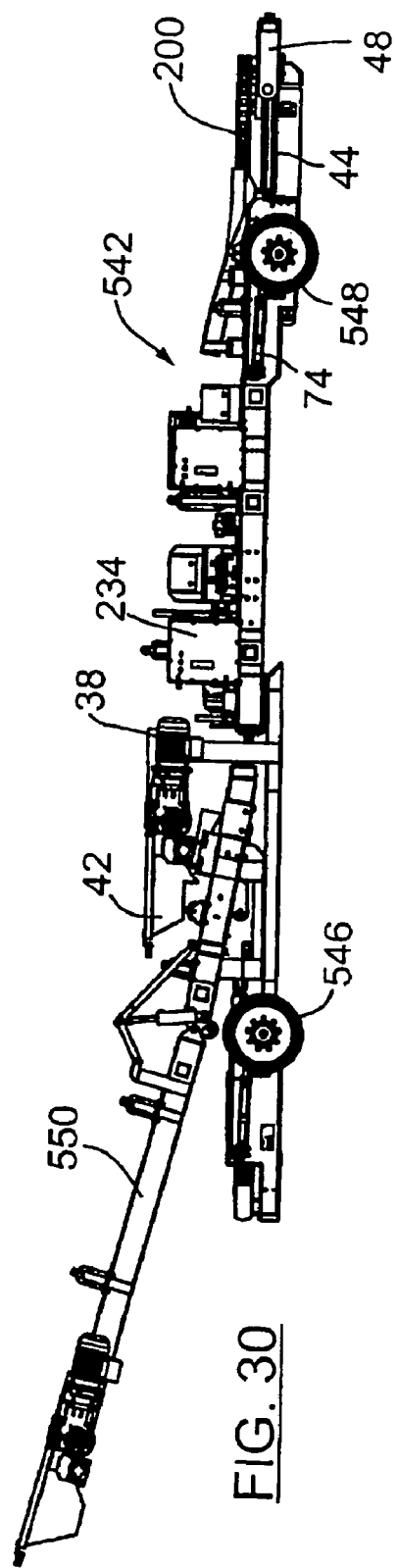
FIG. 30 is a side elevation of a discharge car vehicle which can be provided at an unloading end of a train of conveyor vehicles.
Figure 31:
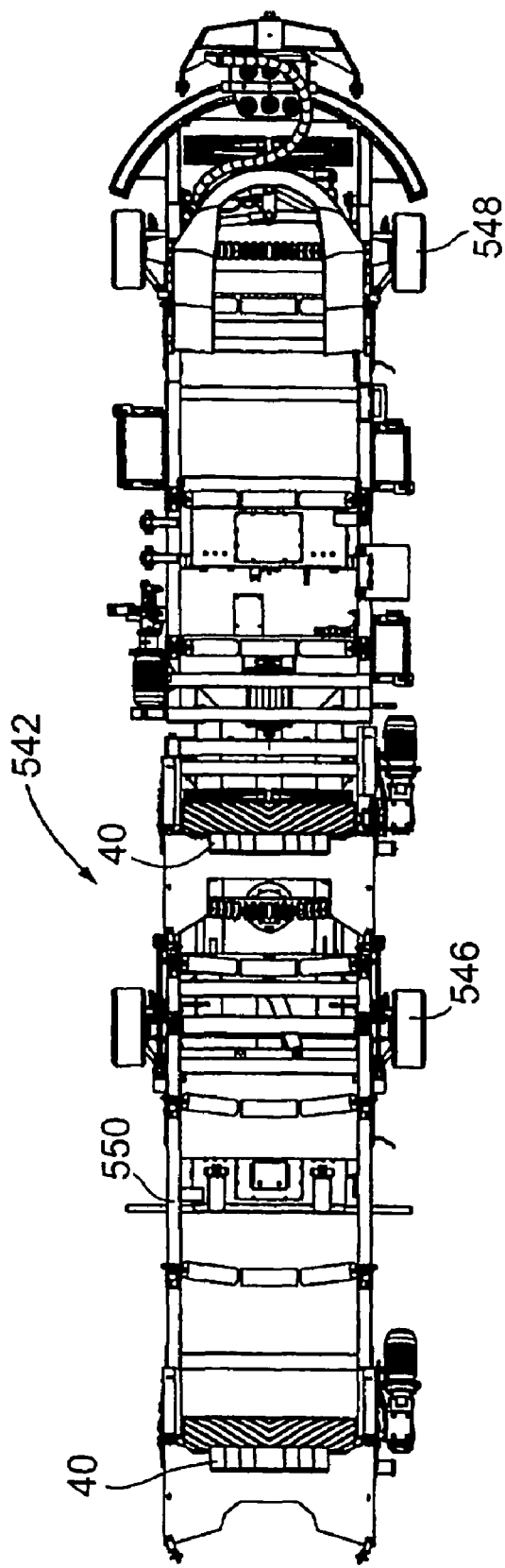
FIG. 31 is a top view of the discharge car vehicle of FIG. 30.

As indicated above, the discharge car vehicle illustrated in FIGS. 30 and 31 has two pairs of steerable wheels. Because it is necessary to steer both sets of wheels on this car, the hydraulic systems illustrated in FIGS. 35A and 35B are duplicated on the discharge car vehicle, which is also provided with an additional manifold assembly and two solenoid valves for the conveyor lift hydraulic cylinder and the conveyor swing hydraulic cylinder used to maneuver the cross conveyor on the discharge vehicle.

While the present invention has been illustrated and described as embodied in an exemplary embodiment, ie. an embodiment having particularly utility for use as a steering system and method for mobile conveyor vehicles, it is to be understood that the present invention is not limited to the details shown herein, since it will be understood that various omissions, modifications, substitutions and changes in the forms and details of the disclosed conveyor vehicle and its method of operation may be made by those skilled in the art without departing in any way from the spirit and scope of the present invention. For example, those of ordinary skill in the conveyor art will readily adapt the present disclosure for various other steering applications involving a train of vehicles without departing from the spirit and scope of the present invention.

We claim:

1. A steering system for steering a plurality of vehicles in a train comprising:
    a selected pair of transversely aligned propelling devices each including a steerable ground engaging wheel and adapted for mounting on opposite sides of one of said vehicles;
    a first power actuator mechanism for steering said selected pair of propelling devices as the train moves over the ground;
    at least two further pairs of transversely aligned propelling devices, each pair including two steerable ground engaging wheels, each of said further pairs being connected to one or more further vehicles and supporting same and each propelling device of each further pair being adapted for mounting on a respective one of two opposite sides of its respective further vehicle;
    a second power actuator mechanism for steering each of such further pairs of propelling devices;
    one angle sensor for measuring a selected intercar angle between each of a corresponding pair of adjacent vehicles and generating a first electrical signal indicative thereof, and
    a control system for controlling each second power actuator mechanism in order to set a steering angle of each of said further pairs of propelling devices, said control system including a plurality of programmable logic controllers (PLCs), a respective one of said PLCs being provided for mounting on each vehicle of the train, means for indicating distances that the wheels in the train have traveled from a selected location, means for determining the current steering angle of each of the selected pair and said at least two further pairs of propelling devices and generating respective second electrical signals indicative thereof, means for storing a series of the steering angles of said selected pair measured by said determining means as the train of vehicles is travelling on a support surface, and means for sending electrical steering signals to said second power actuator mechanism in order to operate said second power actuator mechanism and to thereby steer said further pairs of propelling devices, said control system during use of said steering system adjusting the current steering angle of each further pair to a desired steering angle on the basis of the distance traveled by the train from said selected location, the determined current steering angle of the respective pair, and the measured intercar angle for the respective pair,
    wherein said intercar angle for each pair of adjacent vehicles is defined by central longitudinal axes of the respective pair and a pivot point about which one of the respective pair can pivot relative to the other vehicle of the respective pair in a generally horizontal plane.

2. The steering system according to claim 1 wherein each of said propelling devices includes a hydraulic motor for driving its respective vehicle and a non-rotating wheel support structure for detachably connecting the propelling device to a main frame of the respective vehicle, which is a conveyor vehicle.

3. The steering system according to claim 1 wherein the angle sensor between each corresponding pair of adjacent vehicles includes a tensioned roller chain extending horizontally on a curved chain support having a centre of curvature vertically aligned with said pivot point which is midway between the two propelling devices, and a rotational position transducer mountable on a hitch mechanism for pivotally connecting the respective pair of adjacent vehicles together and having a sensing sprocket engageable with said roller chain.

4. The steering system according to claim 2 wherein said control system is programmed to establish a deadband range for said desired steering angle of each further pair of propelling devices, said deadband range extending a few degrees above and a few degrees below the desired steering angle, and wherein said control system only sends an operational signal to said second power actuator mechanism to adjust the current steering angle of a respective pair of said propelling devices if the current steering angle for that respective pair is outside of said deadband range.

5. The steering system according to claim 1 wherein, when the train is moving in one of two possible directions, the intercar angle is multiplied by −1 by said control system to provide a modified intercar angle used to calculate an amount of steering angle correction for the further pair associated with that intercar angle.

6. The steering system according to claim 5 wherein said control system only adjusts the steering angle of each further pair if the calculated steering angle correction exceeds a predetermined minimum angle correction.

7. The steering system according to claim 1 wherein said control system during use of said steering system can adjust the current steering angle by an amount which offsets a predetermined drift of the respective further pair of propelling devices as they move over ground.

8. The steering system according to claim 7 wherein said control system during use of said steering system only adjusts the current steering angle in a manner which offsets drift of the respective further pair if the desired steering angle exceeds a predetermined positive angle or is less than a predetermined negative angle of equivalent size.

9. A steering system capable of steering a plurality of vehicles in a train, said vehicles being conveyor vehicles arranged in an end-to-end manner with adjacent vehicles being pivotally connected to each other for pivotable movement about a vertical pivot axis, said steering system comprising:
    a selected pair of transversely aligned propelling devices each including a steerable ground engaging wheel and adapted for mounting on opposite sides of one of said vehicles;
    a first power actuator mechanism for steering said selected pair of propelling devices as the train moves over the ground;
    at least two further pairs of transversely aligned propelling devices, each pair including two steerable ground engaging wheels, each of said further pairs being connected to one or more further vehicles and supporting same and each propelling device of each further pair being adapted for mounting on a respective one of two opposite sides of its respective further vehicle;
    a second power actuator mechanism for steering each of a corresponding further pair of propelling devices;
    one angle sensor for measuring a selected intercar angle between each of a corresponding pair of adjacent vehicles and generating a first electrical signal indicative thereof, and
    a control system for controlling each second power actuator mechanism in order to set a steering angle of each of said further pairs of propelling devices, said control system including means for indicating distances that the wheels in the train have travelled from a selected location, means for determining the current steering angle of each of the selected pair and said at least two further pairs of propelling devices and generating respective second electrical signals indicative thereof, means for storing a series of the steering angles of said selected pair measured by said determining means as the train of vehicles is travelling on a support surface, and means for sending electrical steering signals to said second power actuator mechanism in order to operate said second power actuator mechanism and to thereby steer said further pairs of propelling devices, said control system during use of said steering system adjusting the current steering angle of each further pair to a desired steering angle on the basis of the distance travelled by the train from said selected location, the determined current steering angle of the respective pair, and the measured intercar angle for the respective pair, wherein said intercar angle for each pair of adjacent vehicles is defined by central longitudinal axes of the respective pair and the corresponding vertical pivot axis about which one of the respective pair can pivot relative to the other vehicle of the respective pair in a substantially horizontal plane, said corresponding vertical pivot axis being located between a respective one of said further pairs.

10. A method of steering a train of at least three vehicles connected together, said method comprising:

providing a train of at least three vehicles comprising first and second end vehicles and at least one intermediate vehicle, each vehicle having at least one pair of propelling devices mounted thereon and supporting the vehicle, each propelling device including a steerable wheel pivot able about a substantially vertical axis in order to steer the vehicle, the propelling devices of each pair being mounted on opposite sides of the respective vehicle, each vehicle further including a power steering mechanism for pivoting the wheels of each of a corresponding pair about their respective vertical axes and a controller for operating said power steering means in order to steer said train, adjacent vehicles of the train being pivotally connected to each other for pivotal movement about a substantially vertical vehicle pivot axis;

causing said train to move over ground in a desired direction towards one of said end vehicles;

steering a leading pair of the wheels on said one end vehicle to a desired steering angle;

sensing said desired steering angle on a continual or frequent periodic basis and providing first signals indicative thereof to said controller;

storing a series of said desired steering angles as the train is moved over the ground;

sensing on a continual or frequent periodic basis the current steering angle for each pair of wheels trailing said leading pair of wheels relative to the direction of travel of said train;

providing an indication of the distance traveled by said train from a selected location to said controller;

providing controller readable indications of intercar angles between pairs of adjacent vehicles to said controller, each intercar angle being defined by central longitudinal axes of a respective pair of the vehicles and said vehicle pivot axis for the respective pair, and calculating steering angle corrections for trailing pairs of said wheels by means of said controller as the train is moving, said steering angle corrections being a function of the following:

(i) the distance traveled by said train of vehicles;

(ii) the stored desired steering angles of the leading pair of wheels, the controller selecting a stored steering angle for each trailing pair that represents the desired steering angle when said leading pair of wheels was at about the same location where the respective trailing pair is currently located;

(iii) the current intercar angle associated with the respective trailing pair, this associated intercar angle having its defining vertical axis located between the respective trailing pair; and (iv) the current steering angle of each pair of wheels trailing said leading pair of wheels;

wherein when said train is moving in one of two possible directions, said calculating step includes multiplying each current intercar angle by −1 to provide a modified intercar angle used to calculate each steering angle correction.

11. The method of steering a train according to claim 10 wherein said controller includes a programmable logic controller (PLC) on each of said vehicles, said PLCs including a master PLC and a plurality of intelligent slave PLCs.

12. The method of steering a train according to claim 11 wherein said calculating step includes providing a deadband angle range for each selected stored steering angle for each trailing pair, said deadband range extending from a minimum angle set point to a maximum angle set point.

13. The method of steering a train according to claim 10 wherein said calculating step includes calculating an adjusted steering angle position for each trailing pair of wheels by multiplying the current steering angle for the respective pair of wheels by a predetermined amount which offsets drift of the respective trailing pair.

14. A steering system for at least three vehicles connected together to form a train, adjacent vehicles in said train being pivotally connected to each other for pivotable movement about a substantially vertical axis, each vehicle having a pair of steerable wheels mounted thereon and supporting the vehicle, the pairs of steerable wheels including a selected leading pair mounted on one of said vehicles located at one end of the train, said leading pair having its steering angle determined by an operator controlling a steering device for said leading pair during use of the steering system, each vehicle having an actuator mechanism for steering its respective pair of wheels which are mounted on opposite sides of the vehicle, the system comprising:

an electrical controller system for automatically steering all of the pairs of wheels trailing behind said leading pair, said controller system including a memory unit for storing sensed data and an electrical indicator for providing a signal indicating the current distance traveled by the train from a predetermined location;

vehicle angle sensors for measuring selected intercar angles between adjacent vehicles, generating first electrical signals indicative thereof, and transmitting such first electrical signals to said controller system, the intercar angle being an angle defined by central longitudinal axes of a respective pair of adjacent vehicles and said substantially vertical axis about which one of the respective pair can pivot relative to the other vehicle of the pair;

a first wheel angle sensor for providing an electrical signal indicative of the current steering angle of said selected leading pair of wheels to said controller system, said memory unit being adapted to store a series of sensed steering angles for the selected leading pair, each of the stored steering angles corresponding to the steering angle of the leading pair at a series of locations along a path of travel of said train;

additional wheel angle sensors for sensing actual steering angles of the said pairs of wheels trailing behind such leading pair and for providing electrical signals indicative thereof to said controller system;

said controller system during use of said steering system adjusting the actual steering angle for each trailing pair of wheels to a desired steering angle, the controller system calculating an adjustment amount for each trailing pair on the basis of the following parameters:
  (i) the current distance traveled by said train;
  (ii) a respective one of the stored series of sensed steering angles, said controller choosing said respective one of the steering angles representing the steering angle of the leading pair of wheels when said leading pair was at approximately the current location of the respective trailing pair; and
  (iii) the current intercar angle associated with the respective trailing pair, this associated intercar angle having its defining vertical axis close to the respective trailing pair;

wherein said actual steering angle of a respective one of the trailing pairs is only adjusted if the desired steering angle is either greater than a small positive predetermined amount or less than a small negative amount equal to said positive predetermined amount multiplied by −1.

15. A steering system for at least three vehicles connected together to form a train, adjacent vehicles in said train being pivotally connected to each other for pivotable movement about a substantially vertical axis, each vehicle having a pair of steerable wheels mounted thereon and supporting the vehicle, the pairs of steerable wheels including a selected leading pair mounted on one of said vehicles located at one end of the train, said leading pair having its steering angle determined by an operator controlling a steering device for said leading pair during use of the steering system, each vehicle having an actuator mechanism for steering its respective pair of wheels which are mounted on opposite sides of the vehicle, the system comprising:

an electrical controller system for automatically steering all of the pairs of wheels trailing behind said leading pair, said controller system including a memory unit for storing sensed data and an electrical indicator for providing a signal indicating the current distance travelled by the train from a predetermined location;

vehicle angle sensors for measuring selected intercar angles between adjacent vehicles, generating first electrical signals indicative thereof, and transmitting such first electrical signals to said controller system, the intercar angle being an angle defined by central longitudinal axes of a respective pair of adjacent vehicles and said substantially vertical axis about which one of the respective pair can pivot relative to the other vehicle of the pair, each vehicle angle sensor including a tensioned roller chain extending horizontally on a chain support forming a circular arc having a centre of curvature vertically aligned with the substantially vertical axis for pivotal movement between the respective pair of adjacent vehicles, and a rotational position transducer mountable on a hitch mechanism for pivotally connecting the respective pair of adjacent vehicles together and having a sensing sprocket engagable with said roller chain a first wheel angle sensor for providing an electrical signal indicative of the current steering angle of said selected leading pair of wheels to said controller system, said memory unit being adapted to store a series of sensed steering angles for the selected leading pair, each of the stored steering angles corresponding to the steering angle of the leading pair at a series of locations along a path of travel of said train;

additional wheel angle sensors for sensing, actual steering angles of said pairs of wheels trailing behind said leading pair and for providing electrical signals indicative thereof to said controller system;

said controller system during use of said steering system adjusting the actual steering angle for each trailing pair of wheels to a desired steering angle, the controller system calculating an adjustment amount for each trailing pair on the basis of the following parameters:
  (i) the current distance travelled by said train;
  (ii) a respective one of the stored series of sensed steering angles, said controller choosing said respective one of the steering angles representing the steering angle of the leading pair of wheels when said leading pair was at approximately the current location of the respective trailing pair; and
  (iii) the current intercar angle associated with the respective trailing pair, this associated intercar angle having its defining vertical axis close to the respective trailing pair.

16. The steering system according to claim 14 wherein said controller system includes a programmable logic controller (PLC) for each of said vehicles, each PLC being adapted for mounting on a respective one of the vehicles, said PLCs including a master PLC and a plurality of intelligent slave PLCs.

17. The steering system according to claim 14 wherein said controller system is programmed to calculate the adjustment amount for each trailing pair by a series of calculations which include calculating an adjusted steering angle position for each trailing pair by multiplying the actual steering angle for the respective pair by a predetermined amount which offsets drift of the respective trailing pair.

* * * * *